(12) United States Patent
Park et al.

(10) Patent No.: US 10,734,831 B2
(45) Date of Patent: *Aug. 4, 2020

(54) DEVICE FOR PERFORMING WIRELESS CHARGING AND METHOD THEREOF

(71) Applicant: Samsung Electronics Co., Ltd., Gyeonggi-do (KR)

(72) Inventors: Jung Hoon Park, Incheon (KR); Hyun Seok Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,845

(22) Filed: Oct. 2, 2019

(65) Prior Publication Data

US 2020/0036217 A1   Jan. 30, 2020

Related U.S. Application Data

(63) Continuation of application No. 15/368,008, filed on Dec. 2, 2016, now Pat. No. 10,468,903.

(30) Foreign Application Priority Data

Dec. 3, 2015   (KR) ........................ 10-2015-0171411

(51) Int. Cl.
*H02J 7/00*    (2006.01)
*H02J 7/02*    (2016.01)
(Continued)

(52) U.S. Cl.
CPC .............. *H02J 7/025* (2013.01); *G08B 21/18* (2013.01); *H02J 7/0047* (2013.01); *H02J 50/10* (2016.02);
(Continued)

(58) Field of Classification Search
CPC ...................................................... H02J 7/025
(Continued)

(56) References Cited

U.S. PATENT DOCUMENTS 8,575,890 B2   11/2013   Hwang
8,825,118 B2    9/2014   Kim et al.
(Continued)

FOREIGN PATENT DOCUMENTS

KR   1020090053605   5/2009

*Primary Examiner* — Yalkew Fantu
(74) *Attorney, Agent, or Firm* — The Farrell Law Firm, P.C.

(57) ABSTRACT

An electronic device is provided. The electronic device includes a display, a communication circuit that wirelessly transmits and receives power to and from an external electronic device, a sensor circuit that collects a sensor signal associated with a state of the electronic device, and a processor that determines a direction of the display based on the sensor signal. Additionally, when the direction of the display is a first direction, the processor is further configured to receive, from the external electronic device, a first notification signal associated with an event which occurs in the external electronic device while wirelessly charging based on the external electronic device. In addition, the processor is further configured to display a first user interface (UI), through the display, including the first notification signal while wirelessly charging based on the external electronic device.

11 Claims, 16 Drawing Sheets

(51) Int. Cl.
*H02J 50/90* (2016.01)
*H02J 50/10* (2016.01)
*H02J 50/80* (2016.01)
*G08B 21/18* (2006.01)

(52) U.S. Cl.
CPC .............. *H02J 50/80* (2016.02); *H02J 50/90* (2016.02); *H02J 7/00034* (2020.01)

(58) Field of Classification Search
USPC ........................................................ 320/108
See application file for complete search history.

(56) References Cited

U.S. PATENT DOCUMENTS

| | | | | |
|---|---|---|---|---|
| 8,872,386 B2* | 10/2014 | Mach | ................... | H04B 5/0037 |
| | | | | 307/104 |
| 2009/0140692 A1 | 6/2009 | Hwang | | |
| 2010/0207771 A1* | 8/2010 | Trigiani | .............. | B60L 11/1816 |
| | | | | 340/636.1 |
| 2012/0115549 A1 | 5/2012 | Kim et al. | | |
| 2013/0005252 A1* | 1/2013 | Lee | ...................... | H04B 5/0093 |
| | | | | 455/41.1 |
| 2014/0111153 A1* | 4/2014 | Kwon | ..................... | H02J 7/025 |
| | | | | 320/108 |
| 2015/0102892 A1 | 4/2015 | Yeo et al. | | |
| 2015/0180284 A1* | 6/2015 | Kang | ...................... | H02J 50/80 |
| | | | | 307/104 |
| 2017/0133881 A1* | 5/2017 | Cho | ........................ | H02J 50/15 |

\* cited by examiner

DEVICE FOR PERFORMING WIRELESS CHARGING AND METHOD THEREOF

PRIORITY

This application is a Continuation Application of U.S. patent application Ser. No. 15/368,008, filed with the U.S. patent and Trademark Office on Dec. 2, 2016, which claims priority under 35 U.S.C. § 119(a) to a Korean Patent Application filed on Dec. 3, 2015, in the Korean Intellectual Property Office and assigned Serial No. 10-2015-0171411, the entire disclosure of which is incorporated herein by reference.

BACKGROUND

1. Field of the Disclosure

The present disclosure relates generally to an electronic device that perform wireless charging and a method thereof.

2. Description of the Related Art

With developments of information and communication technology, network devices, such as a base station, are installed all over the country. An electronic device sends and receives data to and from another electronic device over a network, allowing a user to make use of the network freely anywhere in the country.

In recent years, various types of electronic devices have provided various functions according to a trend of digital convergence. For example, a smartphone may support a function of connecting to the Internet over the network, as well as a call function. Also, the smartphone may support a function of managing health, a function of playing music or video, and a function of shooting a video, and a picture by using an image sensor.

As the user frequently carries the electronic device, charging and discharging of a battery of a portable electronic device becomes an important issue.

SUMMARY

The present disclosure has been made to address at least the above-mentioned problems and/or disadvantages and to provide at least the advantages described below.

Accordingly, an aspect of the present disclosure is to provide an electronic device that performs wireless charging with an external electronic device, through charging coils that are respectively provided adjacent to a rear surface in each of the electronic device and the external electronic device, when the rear surfaces of the electronic device and the external electronic device face each other so that the charging coils of each are aligned with each other.

Another aspect of the present disclosure is to provide a method, while transmitting and receiving power wirelessly between the electronic device and the external electronic device, for verifying an event occurring in the electronic device, through the external electronic device, when a display of the electronic device faces downward, and a display of the external electronic device faces a user.

In accordance with an aspect of the present disclosure, an electronic device includes a display, a communication circuit that wirelessly transmits and receives power to and from an external electronic device, a sensor circuit that collects a sensor signal associated with a state of the electronic device, and a processor that determines a direction of the display based on the sensor signal. Additionally, when the direction of the display is a first direction, the processor is further configured to receive, from the external electronic device, a first notification signal associated with an event which occurs in the external electronic device while wirelessly charging based on the external electronic device. In addition, the processor is further configured to display a first user interface, through the display, including the first notification signal while wirelessly charging based on the external electronic device.

In accordance with another aspect of the present disclosure, a method for operating an electronic device is provided. The method includes wirelessly transmitting and receiving power to and from an external electronic device, determining an arrangement relationship with the external electronic device, and processing a first notification signal received from the external electronic device or a second notification transmitted to the external electronic device, based on the determined arrangement relationship, wherein the first notification signal provides notification that an event occurs in the external electronic device, and the second notification signal provides notification that an event occurs in the electronic device.

In accordance with another aspect of the present disclosure, an electronic device is provided. The electronic device includes a housing, a conductive pattern arranged in the housing, a power management circuit arranged in the housing and electrically connected with the conductive pattern, a wireless communication circuit arranged in the housing, a display exposed through one surface of the housing, and a processor that wirelessly transmits and receives power to or from an external device, by using at least one of the conductive pattern or the power management circuit, receives, from the external device, through the wireless communication circuit, at least one of at least one event occurring in the external device while the power is transmitted or received and information about a state of operation of external electronic device, and displays at least a portion of the received information in at least a part of the display.

In accordance with another aspect of the present disclosure, an electronic device is provided. The electronic device includes a housing, a conductive pattern arranged in the housing, a power management circuit arranged in the housing and electrically connected with the conductive pattern, a wireless communication circuit arranged in the housing, and a processor that wirelessly transmits and receives power to or from an external device, by using at least one of the conductive pattern or the power management circuit, and transmits, from the external device through the wireless communication circuit, at least one of at least one event occurring in the electronic device while the power is transmitted or received and information about a state of operation of external electronic device, to allow at least a portion of the information to be provided to a user through the external device.

In accordance with another aspect of the present disclosure, a non-transitory computer-readable storage medium, having instructions stored thereon, is provided. The instructions, which when executed, perform the steps of wirelessly transmitting and receiving power to or from an external device, by using at least one of a conductive pattern or a power management circuit of an electronic device, receiving, from the external device, through a wireless communication circuit, at least one of at least one event occurring in the external device while the power is transmitted or received and information about a state of operation of external electronic device, and displays at least a portion of the received information in at least a part of a display of the electronic device.

In accordance with another aspect of the present disclosure, a non-transitory computer-readable storage medium, having instructions stored thereon, is provided. The instructions, which when executed, perform the steps of wirelessly transmitting and receiving power, to or from an external device, by using at least one of the conductive pattern or the power management circuit of an electronic device, and transmitting, from the external device through a wireless communication circuit of the electronic device, at least one of at least one event occurring in the electronic device while the power is transmitted or received and information about a state, to allow at least a portion of the information to be provided to a user through the external device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS OF THE PRESENT DISCLOSURE

Figure 1:
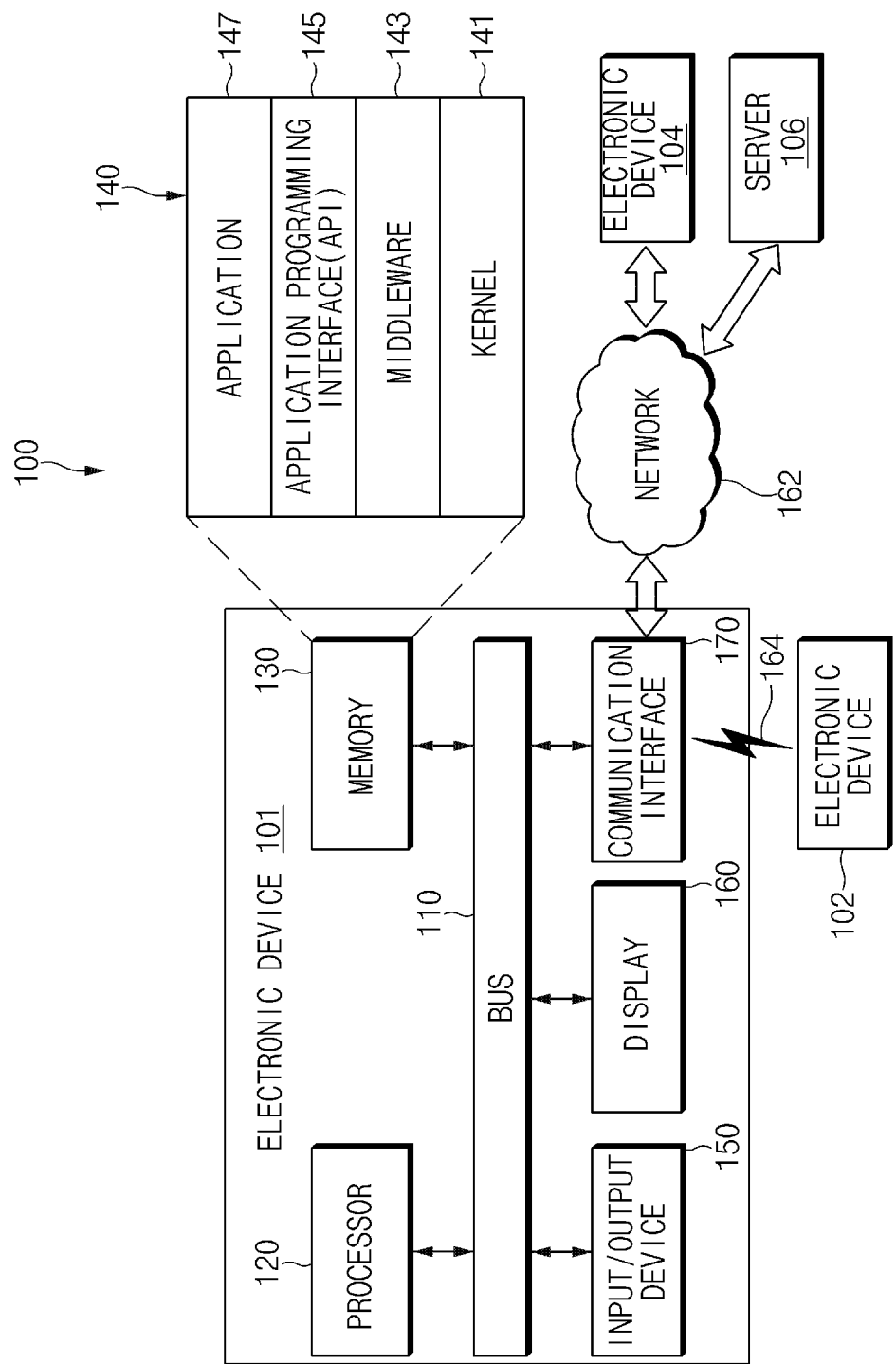
FIG. 1 is a block diagram of an electronic device in a network environment, according to an embodiment of the present disclosure.

Various embodiments of the present disclosure may be described with reference to accompanying drawings, in which similar elements may be marked by similar reference numerals. Accordingly, those of ordinary skill in the art will recognize that modification, equivalent, and/or alternative on the various embodiments described herein can be variously made without departing from the scope and spirit of the present disclosure. As used herein, the expressions "have", "may have", "include" and "comprise" indicate existence of corresponding features (e.g., elements such as numeric values, functions, operations, or components) but do not exclude presence of additional features.

The expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to (1) the case where A is included, (2) the case where B is included, or (3) the case (3) where both A and B are included.

Terms such as "first", "second", and the like used herein may refer to various elements of various embodiments of the present disclosure, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(coupled" or "connected" with/to another element (e.g., a second element), the element may be directly coupled or connected with/to the other element or an intervening element (e.g., a third element) may be present. In contrast, when an element (e.g., a first element) is referred to as being "directly coupled" or "directly connected" with/to another element (e.g., a second element), it should be understood that there are no intervening element (e.g., a third element).

According to the situation, the expression "configured to" used herein may be used interchangeably with the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein. In some cases, even if terms are defined in the specification, they may not be interpreted to exclude embodiments of the present disclosure.

An electronic device according to various embodiments of the present disclosure may include at least one of a smartphone, tablet personal computer (PC), mobile phone, video telephone, e-book reader, desktop PC, laptop PC, netbook computer, workstation, server, personal digital assistant (PDA), portable multimedia player (PMP), motion picture experts group (MPEG-1 or MPEG-2) audio layer 3 (MP3) player, mobile medical device, camera, wearable device (e.g., a head-mounted-device (HMD), such as electronic glasses), electronic apparel, electronic bracelet, electronic necklace, electronic appcessory, electronic tattoo, smart watch, and the like.

According to another embodiment, the electronic device may be a home appliance. The home appliance may include at least one of a television (TV), digital versatile disc (DVD) player, audio device, refrigerator, air conditioner, cleaner, oven, microwave oven, washing machine, air cleaner, set-top box, home automation control panel, security control panel, TV box (e.g., Samsung HomeSync™, Apple TV™, or Google TV™), game console (e.g., Xbox™ or PlayStation™), electronic dictionary, electronic key, camcorder, electronic picture frame, or the like.

According to another embodiment, the electronic device may include at least one of a medical device (e.g., various portable medical measurement devices (e.g., a blood glucose monitoring device, heartbeat measuring device, blood pressure measuring device, body temperature measuring device, and the like), a magnetic resonance angiography (MRA) device, a magnetic resonance imaging (MRI) device, a computed tomography (CT) device, scanners, and an ultrasonic device), navigation device, global positioning system (GPS) receiver, event data recorder (EDR), flight data recorder (FDR), vehicle infotainment device, electronic equipment for vessels (e.g., navigation system and gyrocompass), avionics device, security device, head unit for vehicles, industrial or home robot, automatic teller machine (ATMs), points of sales (POS) machine, or internet of things (IoT) device (e.g., a light bulb, various sensors, electric or gas meter, sprinkler device, fire alarm, thermostat, street lamp, toaster, exercise equipment, hot water tank, heater, boiler, and the like).

According to another embodiment, the electronic device may include at least one of a part of furniture or a building/structure, electronic board, electronic signature receiving device, projector, or various measuring instrument (e.g., a water meter, electricity meter, gas meter, wave meter, and the like).

In the various embodiments, the electronic device may be one of the above-described various devices or a combination thereof. The electronic device may be a flexible device. Furthermore, the electronic device is not be limited to the above-described electronic devices and may include other electronic devices and new electronic devices according to the development of technologies.

Hereinafter, an electronic device according to the various embodiments will be described with reference to the accompanying drawings. The term "user" used herein may refer to a person who uses an electronic device or may refer to a device (e.g., an artificial intelligence electronic device) that uses an electronic device.

FIG. 1 is a block diagram of an electronic device in a network environment, according to an embodiment of the present disclosure.

Referring to FIG. 1, an electronic device 100 in a network environment is provided. The electronic device 100 may include a bus 110, a processor 120, a memory 130, an input/output interface 150, a display 160, and a communication interface 170. The electronic device 100 may omit at least one of the above-described elements or may further include other elements.

The bus 110 may be a circuit which connects the components 120 to 170 with each other and transmits a communication signal (e.g., a control message and/or data) between the components.

The processor 120 may include one or more of a central processing unit (CPU), an application processor (AP), or a communication processor (CP). The processor 120 may perform calculation or data processing about control and/or communication of t another component of the electronic device 100.

The memory 130 may include a volatile and/or non-volatile memory. The memory 130 may store a command or data associated with another component of the electronic device 100. The memory 130 may store software and/or a program 140. The program 140 may include a kernel 141, a middleware 143, an application programming interface (API) 145, and/or at least one application 147. At least part of the kernel 141, the middleware 143, or the API 145 may be referred to as an operating system (OS).

The kernel 141 may control or manage system resources (e.g., the bus 110, the processor 120, or the memory 130, and the like) used to execute an operation or function implemented in the other programs (e.g., the middleware 143, the API 145, or the application 147). Also, as the middleware 143, the API 145, or the application 147 accesses a separate component of the electronic device 100, the kernel 141 may provide an interface which may control or manage system resources.

The middleware 143 may play a role as an intermediary such that the API 145 or the application 147 communicates with the kernel 141 to communicate data.

Also, the middleware 143 may process one or more work requests, received from the application 147, in order of priority. For example, the middleware 143 may assign a priority for using system resources (the bus 110, the processor 120, or the memory 130, and the like) of the electronic device 100 to at least one of the application 147. For example, the middleware 143 may perform scheduling or load balancing for the one or more work requests by processing the one or more work requests in order of the priority assigned to the application 147.

The API 145 may be an interface in which the application 147 controls a function provided from the kernel 141 or the middleware 143. For example, the API 145 may include at least one interface or function (e.g., a command) for file control, window control, image processing, or text control, and the like.

The input/output interface 150 may play a role as an interface which may transmit a command or data input from a user or another external device to another component of the electronic device 100. Also, the input/output interface 150 may output an instruction or data received from another component of the electronic device 100 to the user or the other external device.

The display 160 may include a liquid crystal display (LCD), a light emitting diode (LED) display, an organic LED (OLED) display, a microelectromechanical systems (MEMS) display, or an electronic paper display. The display 160 may display a variety of content (e.g., text, images, videos, icons, or symbols, and the like) to the user. The display 160 may include a touch screen, and may receive touch, gesture, proximity, or a hovering input using an electronic pen or part of a body of the user.

The communication interface 170 may establish communication between the electronic device 100 and an external device (e.g., a first external electronic device 102, a second external electronic device 104, or a server 106). For example, the communication interface 170 may communicate with the first external electronic device 102 through local-area communication 164, and may connect to a network 162 through wireless communication or wired communication and may communicate with the second external electronic device 104 or the server 106.

The wireless communication may use at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include the local-area communication 164. The local-area communication 164 may include at least one of Wi-Fi communication, Bluetooth (BT) communication, near field communication (NFC), or global navigation satellite system (GNSS) communication, and the like.

A magnetic secure transmission (MST) module may generate a pulse based on transmission data using an electromagnetic signal and may generate a magnetic field signal based on the pulse. The electronic device 100 may output the magnetic field signal to a point of sales (POS) system. The POS system may restore the data by detecting the magnetic field signal using an MST reader and converting the detected magnetic field signal into an electric signal.

The GNSS may include at least one of a global positioning system (GPS), a Glonass, a Beidou navigation satellite system (Beidou), or a Galileo (i.e., the European global satellite-based navigation system) according to an available area or a bandwidth, and the like. Hereinafter, the term "GPS" used herein may be interchangeably with the term "GNSS".

The wired communication may include at least one of universal serial bus (USB) communication, high definition multimedia interface (HDMI) communication, recommended standard 232 (RS-232) communication, or plain old telephone service (POTS) communication, and the like. The network 162 may include a telecommunications network at least one of a computer network (e.g., a local area network (LAN) or a wide area network (WAN)), the Internet, or a telephone network.

Each of the first and second external electronic devices 102 and 104 may be the same as or different device from the electronic device 100. The server 106 may include a group of one or more servers. According to various embodiments, all or some of operations executed in the electronic device 100 may be executed in another electronic device or a plurality of electronic devices (e.g., the first external electronic device 102, the second external electronic device 104, or the server 106). In this case, if the electronic device 100 should perform any function or service automatically or according to a request, it may request the first external electronic device 102, the second external electronic device 104, or the server 106 to perform at least part of the function or service, rather than executing the function or service for itself or in addition to the function or service. The first external electronic device 102, the second external electronic device 104, or the server 106 may execute the requested function or the added function and may transmit the executed result to the electronic device 100. The electronic device 100 may process the received result without change or additionally and may provide the requested function or service. For this purpose cloud computing technologies, distributed computing technologies, or client-server computing technologies may be used.

Figure 2:
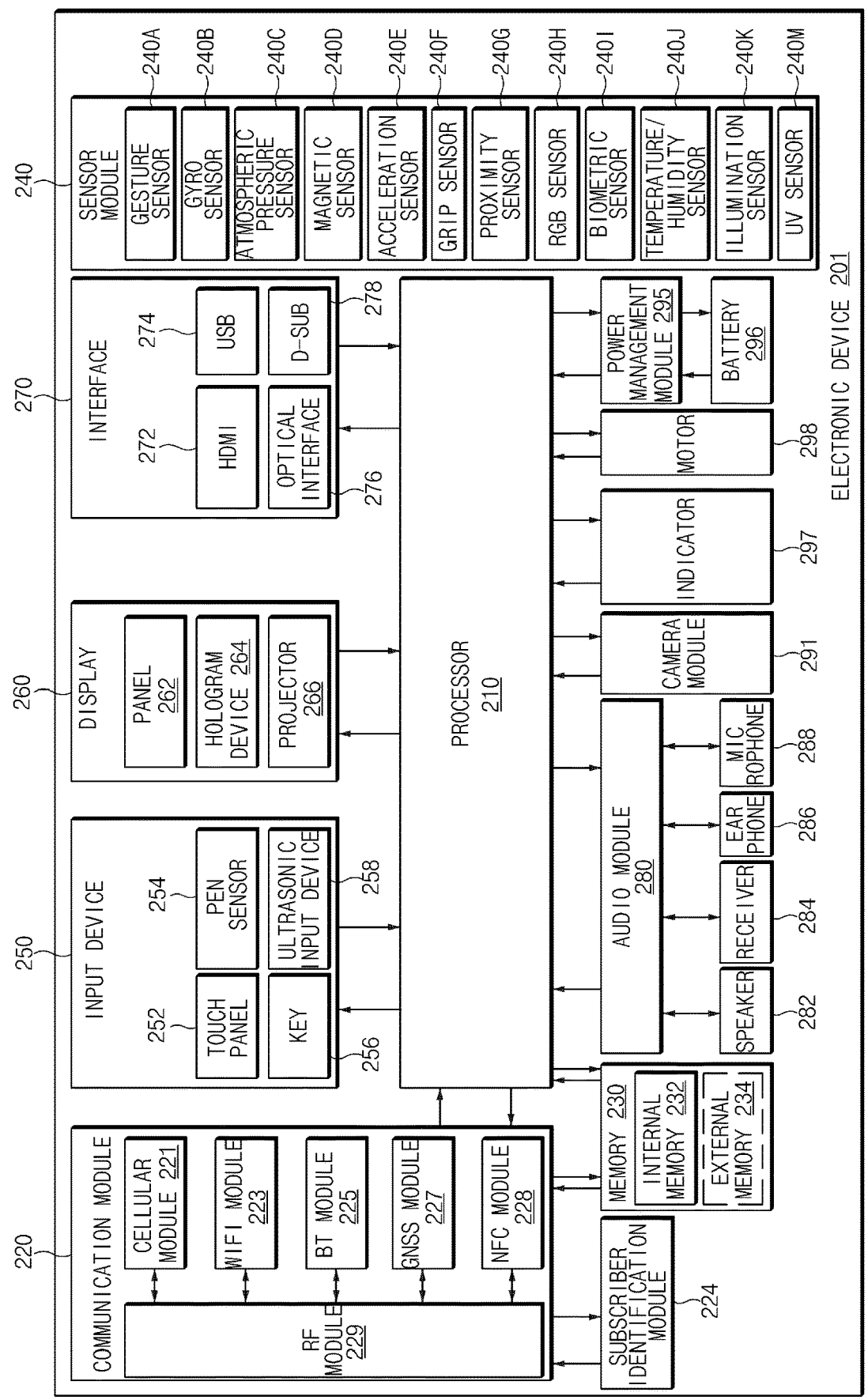
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, the electronic device 200 may include all or a part of the electronic device 100 illustrated in FIG. 1. The electronic device 200 may include one or more processors (e.g., an application processor) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive an operating system (OS) or an application program to control a plurality of hardware or software components connected thereto and may process and compute a variety of data. The processor 210 may be implemented with a system on chip (SoC). The processor 210 may include a graphic processing unit (GPU) and/or an image signal processor. The processor 210 may include at least some (e.g., a cellular module 221) of the components shown in FIG. 2. The processor 210 may load a command or data received from at least one of other components (e.g., a non-volatile memory) into a volatile memory to process the data and may store various data in a non-volatile memory.

The communication module 220 may have the same or similar configuration as the communication interface 170 of FIG. 1. The communication module 220 may include the cellular module 221, a Wi-Fi module 223, a Bluetooth (BT) module 225, a global navigation satellite system (GNSS) module 227 (e.g., a GPS module, a Glonass module, a Beidou module, or a Galileo module), a near field communication (NFC) module 228, and a radio frequency (RF) module 229. The communication module 220 may additionally include an MST module.

The cellular module 221 may provide a voice call service, a video call service, a text message service, or an Internet service, and the like through a communication network. The cellular module 221 may identify and authenticate the electronic device 200 in a communication network using the SIM 224. The cellular module 221 may perform at least part of functions which may be provided by the processor 210. The cellular module 221 may include a communication processor (CP).

The Wi-Fi module 223, the BT module 225, the GNSS module 227, the NFC module 228, or the MST module may include a processor for processing data transmitted and received through the corresponding module. At least one of the cellular module 221, the Wi-Fi module 223, the BT module 225, the GNSS module 227, the NFC module 228, or the MST module may be included in one integrated chip (IC) or one IC package.

The RF module 229 may transmit and receive a communication signal (e.g., an RF signal). The RF module 229 may include a transceiver, a power amplifier module (PAM), a frequency filter, or a low noise amplifier (LNA), or an antenna, and the like.

At least one of the cellular module 221, the Wi-Fi module 223, the BT module 225, the GNSS module 227, the NFC module 228, or the MST module may transmit and receive an RF signal through a separate RF module.

The SIM 224 may include a card which includes a SIM and/or an embedded SIM. The SIM 224 may include unique identification information (e.g., an integrated circuit card identifier (ICCID)) or subscriber information (e.g., an international mobile subscriber identity (IMSI)).

The memory 230 may include an embedded memory 232 or an external memory 234. The embedded memory 232 may include at least one of a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 234 may include a flash drive a compact flash (CF), a secure digital (SD), a micro-SD, a mini-SD, an extreme digital (xD), a multimedia car (MMC), or a memory stick, and the like. The external memory 234 may operatively and/or physically connect with the electronic device 200 through various interfaces.

The sensor module 240 may measure a physical quantity or may detect an operation state of the electronic device 200, and may convert the measured or detected information to an electric signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a red, green, blue (RGB) sensor 240H, a biometric sensor 240I, a temperature/humidity sensor 240J, an illumination sensor 240K, or an ultraviolet (UV) sensor 240M. Additionally or alternatively, the sensor module 240 may further include an e-nose sensor, an electromyography (EMG) sensor, an electroencephalogram (EEG) sensor, an electrocardiogram (ECG) sensor, an infrared (IR) sensor, an iris sensor, and/or a fingerprint sensor, and the like. The sensor module 240 may further include a control circuit for controlling at least one or more sensors included therein. The electronic device 200 may further include a processor configured to control the sensor module 240, as part of the processor 210 or to be independent of the processor 210. While the processor 210 is in a sleep state, the electronic device 200 may control the sensor module 240.

The input device 250 may include a touch panel 252, a (digital) pen sensor 254, a key 256, or an ultrasonic input device 258.

The touch panel 252 may use at least one of a capacitive type, a resistive type, an infrared type, or an ultrasonic type. Also, the touch panel 252 may further include a control circuit. The touch panel 252 may further include a tactile layer and may provide a tactile reaction to a user.

The (digital) pen sensor 254 may be part of the touch panel 252 or may include a separate sheet for recognition.

The key 256 may include a physical button, an optical key, or a keypad. The ultrasonic input device 258 may allow the electronic device 200 to detect a sound wave using a microphone 288 and to verify data through an input tool generating an ultrasonic signal.

The display 260 may include a panel 262, a hologram device 264, or a projector 266.

The panel 262 may include the same or similar configuration as the display 160. The panel 262 may be implemented to be flexible, transparent, or wearable. The panel 262 and the touch panel 252 may be integrated into one module.

The hologram device 264 may show a stereoscopic image in a space using interference of light.

The projector 266 may project light onto a screen to display an image. The screen may be positioned inside or outside the electronic device 200. The display 260 may further include a control circuit for controlling the panel 262, the hologram device 264, or the projector 266.

The interface 270 may include a high-definition multimedia interface (HDMI) 272, a universal serial bus (USB) 274, an optical interface 276, or a D-subminiature 278. The interface 270 may be included in the communication interface 170 shown in FIG. 1.

Additionally or alternatively, the interface 270 may include a mobile high definition link (MHL) interface, an SD card/multimedia card (MMC) interface, or an infrared data association (IrDA) standard interface.

The audio module 280 may convert a sound and an electric signal in dual directions. At least part of components of the audio module 280 may be included in the input/output interface 150 shown in FIG. 1. The audio module 280 may process sound information input or output through a speaker 282, a receiver 284, an earphone 286, or the microphone 288, and the like.

The camera module 291 may be a device which captures a still image and a moving image. The camera module 291 may include one or more image sensors (e.g., a front sensor or a rear sensor), a lens, an image signal processor (ISP), or a flash (e.g., an LED or a xenon lamp).

The power management module 295 may manage power of the electronic device 200. The power management module 295 may include a power management integrated circuit (PMIC), a charger IC or a battery gauge. The PMIC may have a wired charging method and/or a wireless charging method. The wireless charging method may include a magnetic resonance method, a magnetic induction method, or an electromagnetic method, and the like. An additional circuit for wireless charging a coil loop, a resonance circuit, or a rectifier, and the like may be further provided. The battery gauge may measure the remaining capacity, voltage, current, or temperature of the battery 296. The battery 296 may include a rechargeable battery or a solar battery.

The indicator 297 may display a specific state of the electronic device 200 or part (e.g., the processor 210) thereof a booting state, a message state, or a charging state, and the like.

The motor 298 may convert an electric signal into a mechanical vibration and may generate a vibration or a haptic effect, and the like. The electronic device 200 may include a processing unit (e.g., a GPU) for supporting a mobile TV. The processing unit for supporting the mobile TV may process media data according to standards a digital multimedia broadcasting (DMB) standard, a digital video broadcasting (DVB) standard, or a mediaFlo™ standard, and the like.

Each of the above-mentioned elements of the electronic device 200, according to various embodiments of the present disclosure, may be configured with one or more components, and names of the corresponding elements may be changed according to the type of the electronic device 200. The electronic device 200 may include at least one of the above-mentioned elements, some elements may be omitted, or other additional elements may be further included. Also, some of the elements of the electronic device 200 may be combined with each other to form one entity, thereby making it possible to perform the functions of the corresponding elements in the same manner as before the combination.

Figure 3:
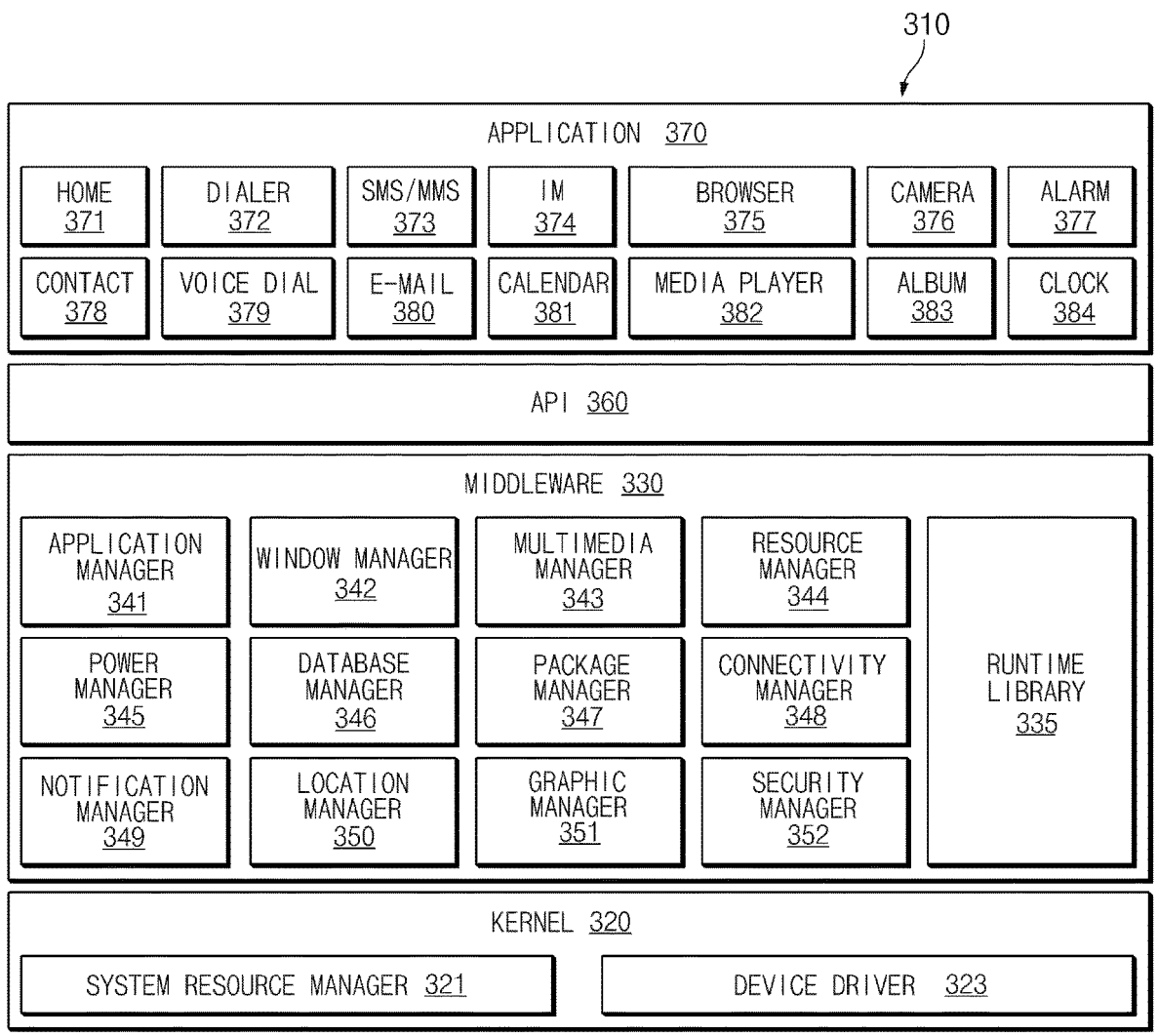
FIG. 3 is a block diagram of a program module of an electronic device, according to an embodiment of the present disclosure.

FIG. 3 is a block diagram of a program module of an electronic device, according to an embodiment of the present disclosure.

Referring to FIG. 3 is a block diagram of a program module 310 of the electronic device 100 is shown. The program module 310 may include an operating system (OS) that controls resources associated with the electronic device 100 and/or the application 147 driven on the OS. The OS may be Android™, iOS™, Windows™, Symbian™, Tizen™, Bada™, or the like.

The program module 310 may include a kernel 320, a middleware 330, an application programming interface (API) 360, and/or an application 370. At least part of the program module 310 may be preloaded on the electronic device 100, or may be downloaded from the first external electronic device 102, the second external electronic device 104, or the server 106.

The kernel 320 may include a system resource manager 321 and/or a device driver 323. The system resource manager 321 may control, assign, or collect, and the like system resources. The system resource manager 321 may include a process management unit, a memory management unit, or a file system management unit, and the like. The device driver 323 may include a display driver, a camera driver, a Bluetooth (BT) driver, a shared memory driver, a universal serial bus (USB) driver, a keypad driver, a Wi-Fi driver, an audio driver, or an inter-process communication (IPC) driver.

The middleware 330 may provide functions the application 370 needs in common, and may provide various functions to the application 370 through the API 360 such that the application 370 efficiently uses limited system resources in the electronic device 100. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include a library module used by a compiler to add a new function through a programming language while the application 370 is executed. The runtime library 335 may perform a function about input and output management, memory management, or an arithmetic function.

The application manager 341 may manage a life cycle of at least one of the application 370.

The window manager 342 may manage graphic user interface (GUI) resources used on a screen of the electronic device 100.

The multimedia manager 343 may determine a format utilized for reproducing various media files and may encode or decode a media file using a codec corresponding to the corresponding format.

The resource manager 344 may manage source codes of at least one of the application 370, and may manage resources of a memory or a storage space, and the like.

The power manager 345 may act together with a basic input/output system (BIOS) and the like, may manage a battery or a power source, and may provide power information utilized for an operation of the electronic device 100.

The database manager 346 may generate, search, or change a database to be used in at least one of the application 370.

The package manager 347 may manage installation or update of an application distributed by a type of a package file.

The connectivity manager 348 may manage a wireless connection, such as Wi-Fi connection or BT connection, and the like.

The notification manager 349 may display or notify a user of events, such as an arrival message, an appointment, and proximity notification, by a method which is not disturbed to the user. The location manager 350 may manage location information of the electronic device.

The graphic manager 351 may manage a graphic effect to be provided to the user or a user interface (UI) related to the graphic effect.

The security manager 352 may provide all security functions utilized for system security or user authentication, and the like.

When the electronic device 100 has a phone function, the middleware 330 may further include a telephony manager for managing a voice or video communication function of the electronic device 100.

The middleware 330 may include a middleware module which configures combinations of various functions of the above-described components. The middleware 330 may provide a module which specializes according to kinds of OSs to provide a differentiated function. Also, the middleware 330 may dynamically delete some of old components or may add new components.

The API 360 may be a set of API programming functions, and may be provided with different components according to OSs. For example, in case of Android™ or iOS™, one API set may be provided according to platforms. In case of Tizen™, two or more API sets may be provided according to platforms.

The application 370 may include one or more of a home application 371, a dialer application 372, a short message service/multimedia message service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, and a clock application 384. The application 370 may additionally include a health care application (e.g., an application for measuring quantity of exercise or blood sugar, and the like) or an environment information application (e.g., an application for providing atmospheric pressure information, humidity information, or temperature information, and the like), and the like.

The application 370 may include an information exchange application for exchanging information between the electronic device 100 and an external electronic device (e.g., the first external electronic device 102 or the second external electronic device 104). The information exchange application may include a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device 100, to the external electronic device (e.g., the first external electronic device 102 or the second external electronic device 104). Also, the notification relay application may receive notification information from the external electronic device, and may provide the received notification information to the user of the electronic device.

The device management application may manage (e.g., install, delete, or update) at least one (e.g., a function of turning on/off the external electronic device itself (or partial components) or a function of adjusting brightness (or resolution) of a display) of functions of the external electronic device (e.g., the first external electronic device 102 or the second external electronic device 104) which communicates with the electronic device, an application which operates in the external electronic device, or a service (e.g., a call service or a message service) provided from the external electronic device.

The application 370 may include an application (e.g., the health card application of a mobile medical device) which is preset according to attributes of the external electronic device (e.g., the first external electronic device 102 or the second external electronic device 104). The application 370 may include an application received from the external electronic device (e.g., the server 106, the first external electronic device 102, or the second external electronic device 104). The application 370 may include a preloaded application or a third party application which may be downloaded from the server 106.

Names of the components of the program module 310 according to various embodiments of the present disclosure may differ according to kinds of OSs.

At least part of the program module 310 may be implemented with software, firmware, hardware, or at least two or more combinations thereof. At least part of the program module 310 may be implemented by the processor 120. At least part of the program module 310 may include a module, a program, a routine, sets of instructions, or a process, and the like for performing one or more functions.

Figure 4:
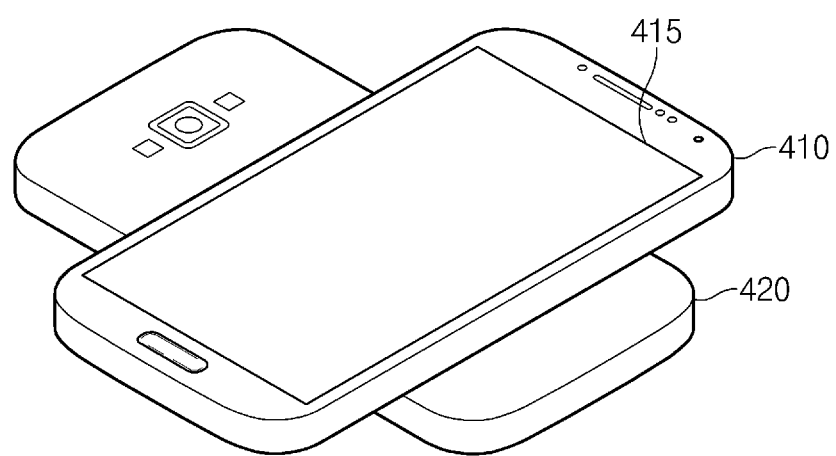
FIG. 4 illustrates a first electronic device and a second electronic device performing wireless charging, according to an embodiment of the present disclosure.

FIG. 4 illustrates a first electronic device and a second electronic device performing wireless charging, according to an embodiment of the present disclosure.

Referring to FIG. 4, a first electronic device 410 may perform wireless charging with a second electronic device 420. Each of the first electronic device 410 and the second electronic device 420 may include a charging coil for performing the wireless charging. The charging coil may be positioned on a rear surface of each of the first electronic device 410 and the second electronic device 420. For this reason, to perform the wireless charging, the rear surface of the first electronic device 410 may face the rear surface of the second electronic device 420. A display may be arranged on a front surface of the second electronic device 420.

When a display 415 of the first electronic device 410 faces a specified direction (e.g., a user direction), a display of the second electronic device 420 may be positioned such that the user does not view the display of the second electronic device 420. For example, the first electronic device 410 and the second electronic device 420 may is positioned on a table or desk for the wireless charging as illustrated in FIG. 4. When the rear surfaces of the first electronic device 410 and the second electronic device 420 do not face each other, the wireless charging may not be made or the efficiency of the wireless charging may not be good.

The first electronic device 410 may determine a direction, which a front surface of the first electronic device 410 faces, through a sensor provided therein. The first electronic device 410 may determine an arrangement relationship with the second electronic device 420 through the operation. For example, the first electronic device 410 may determine whether the front surface of the first electronic device 410 faces a first direction (e.g., a sky direction) or a second direction (e.g., a ground direction), by using a gyro sensor. Alternatively, the first electronic device 410 may determine a direction that the front surface of the first electronic device 410 faces, based on whether an image associated with a user, a bright image of specified illuminance or more, or a dark image of specified illuminance or less is captured by using an image sensor provided on the front surface of the first electronic device 410.

Below, a description will be given under the assumption that it is determined that the first electronic device 410 is positioned on the second electronic device 420.

The first electronic device 410 may receive a signal, which corresponds to an event occurring in the second electronic device 420, from the second electronic device 420. The event may correspond to receiving an incoming call, a message, or the like. Also, the event may correspond to providing notification that a schedule or an alarm time comes.

The first electronic device 410 may previously determine whether to receive a signal corresponding to the event from the second electronic device 420. For example, the first electronic device 410 may output a user interface (UI), which is configured to determine whether to receive the signal, through a display 415. In the case where a user input permitting receiving the signal is received from the user through the UI, the first electronic device 410 may receive the signal from the second electronic device 420 and may provide the received signal to the user.

The first electronic device 410 may provide the user with the event, which occurs in the second electronic device 420, as a response to the signal received from the second electronic device 420. For example, in the case where an incoming call is being received to the second electronic device 420, the first electronic device 410 may inform the second electronic device 420 that the incoming call is being received. The first electronic device 410 may receive a user input for selecting whether to respond to the incoming call from the user. The first electronic device 410 may respond to or may not respond to the incoming call based on the user input. A way to not respond to the incoming call may include ignoring the incoming call without any response, sending a message that informs a terminal, which transmits the incoming call, that a current telephone conversation with regard to the incoming call is not possible, and the like. The message that provides notification that the current telephone conversation is not possible may be sent through the second electronic device 420 to the terminal that transmits the incoming call.

Further, a way to respond to the incoming call may include performing a speaker phone conversation through a speaker of the second electronic device 420, performing a speaker phone conversation through the first electronic device 410 by operating the first electronic device 410 as a Bluetooth speaker, and the like. Also, it may be possible to respond to the incoming call through a headset (e.g., a Bluetooth headset) that is wirelessly connected with the first electronic device 410 or the second electronic device 420.

Various ways to respond to the incoming call may verify battery levels of the first electronic device 410 and the second electronic device 420 and may allow batteries thereof to be efficiently and selectively operated (or managed) according to the verified battery levels. Alternatively, the first electronic device 410 may adaptively determine whether to make a call through a speaker or Bluetooth headset of any one of the first electronic device 410 and the second electronic device 420, based on the battery levels of the first electronic device 410 and the second electronic device 420. For example, in the case where the user decides to respond to an incoming call received in the second electronic device 420 through the first electronic device 410, based on a given scenario, the user may make a call based on a speaker of one of the first electronic device 410 and the second electronic device 420 or may make a call through a Bluetooth headset.

In the case where a message is received to the second electronic device 420, the first electronic device 410 may inform the second electronic device 420 that a received message exists.

The first electronic device 410 may provide, through the display 415, a UI that is configured to notify the second electronic device 420 that a received message exists and to query whether the user responds to the notification. According to a user input, the message may be provided in the first electronic device 410 and/or in the second electronic device 420. The message may be provided in the second electronic device 420 through a speaker by voice. Additionally, or alternatively, the message may be provided through a speaker of the first electronic device 410 by voice.

At least a portion of a message, which is received in the second electronic device 420 and is to be provided to the user, may be processed. For example, in the case where the second electronic device 420 receives a message, the first electronic device 410 may provide the message received in the second electronic device 420 to the user without modification, but the first electronic device 410 may provide only a portion of the message. Whether to provide the whole message or a portion thereof may be determined through a user input in the first electronic device 410 or may be previously determined according to settings of the second electronic device 420. Also, in the case where only a portion of the message is provided, the messages may be processed in the first electronic device 410 or in the second electronic device 420.

Figure 5:
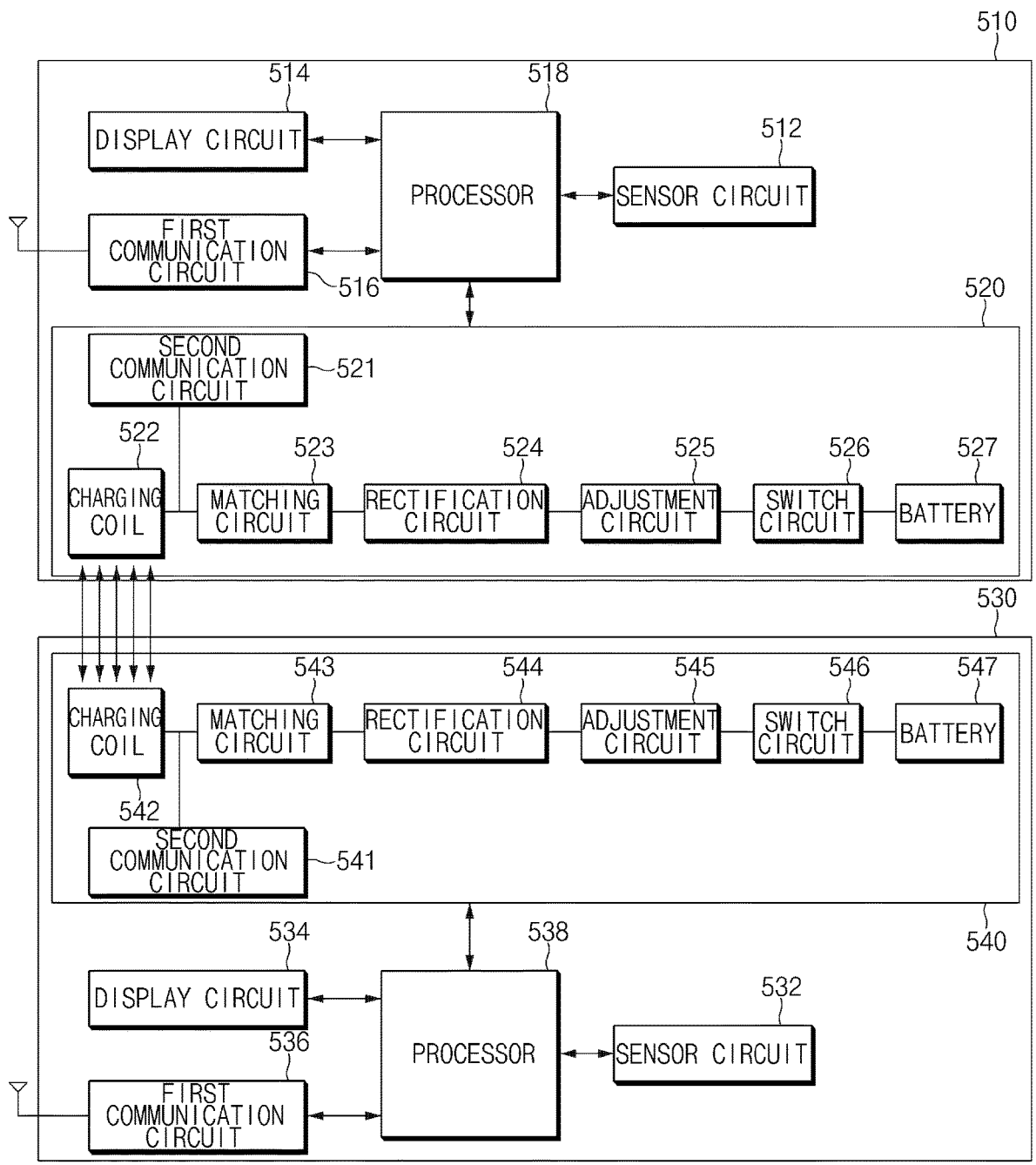
FIG. 5 is a block diagram of a first electronic device and a second electronic device, according to an embodiment of the present disclosure.

FIG. 5 is a block diagram of a first electronic device and a second electronic device, according to an embodiment of the present disclosure.

Referring to FIG. 5, a first electronic device 510 and a second electronic device 530 are provided.

The first electronic device 510 may include a sensor circuit 512, a display circuit 514, a first communication circuit 516, a processor 518, and a charging circuit 520.

The second electronic device 530 may include a sensor circuit 532, a display circuit 534, a first communication circuit 536, a processor 538, and a charging circuit 540.

The configuration of the first electronic device 510 illustrated in FIG. 5 may be only one implementation and may be variously changed or modified. For example, the first electronic device 510 may further include a user interface for receiving any instruction or information from the user. In this case, the user interface may be an input device such as a keyboard, a mouse, or the like, but the user interface may also be a graphic user interface (GUI) provided through a display of the first electronic device 510.

The sensor circuit 512 may sense a rotation or positioned state of the first electronic device 510 or a state of a circumference of the first electronic device 510 by using various sensors provided in the first electronic device 510.

The display circuit 514 may provide a variety of content through a display of the first electronic device 510. The content may include a widget screen, an application execution screen, a text, an image, a video, an icon, a symbol, or the like. The screen may include a liquid crystal display (LCD), a light emitting diode (LED) display, an organic LED (OLED) display, a microelectromechanical systems (MEMS) display, an electronic paper display, or the like.

The first communication circuit 516 may communicate with the outside. For example, the first communication circuit 516 may receive a message or an incoming call from a base station device. Also, the first communication circuit 516 may communicate with the first communication circuit 536 of the second electronic device 530. The first communication circuit 516 and the first communication circuit 536 of the second electronic device 530 may communicate with each other through the base station device or may perform local area communication with each other without the base station device. For example, the local area communication may include BT communication, Bluetooth low energy (BLE) communication, NFC, Wi-Fi communication, MST communication, infrared (IR) communication, RF communication, Zigbee communication, and the like.

The processor 518 may be implemented with a SoC and may include one or more of a CPU, a GPU, an image signal processor, an AP, and a CP. The processor 518 may load and process an instruction or data, received from at least one of other elements (e.g., the sensor circuit 512, the display circuit 514, the first communication circuit 516, and the charging circuit 520), on the memory 450 and may store various data in the memory 450.

The processor 518 may determine whether the second electronic device 530 is neighboring, through the sensor circuit 512. For example, the processor 518 may determine whether the charging coil 522 of the first electronic device 510 and the charging coil 542 of the second electronic device 530 are positioned to correspond to each other.

The processor 518 may determine whether the first electronic device 510 and the second electronic device 530 are adjacent to each other, through in-band communication or out-band communication.

The in-band communication corresponds to communication at the same frequency as a frequency that the first electronic device 410 and the second electronic device 420 use for a wireless power transfer. That is, the in-band communication may be to exchange information through a second communication circuit 521. In magnetic induction, the in-band communication may detect that the two coils are adjacent to each other, through a change in current induced in a coil (selection phase) and may perform ping-identification/configuration-power transfer phases. In addition, an electronic device that receives power may further include a switch and may receive or may not receive power, which is transmitted from an electronic device that transmits the power, through a switching operation of the switch. Accordingly, the electronic device that transmits power may recognize an on state or an off state of the switch included in the electronic device that receives the power, by detecting the amount of power that is consumed in the electronic device transmitting power.

The out-band communication corresponds to communication using a frequency different from a frequency that an electronic device supplying power and an electronic device receiving the power use to transmit power. The out-band communication may correspond to a local area communication protocol (e.g., BT, Wi-Fi, NFC, or the like).

In this case, the processor 518 may provide, through the display circuit 514, an UI that is configured to query whether to perform wireless charging. In the case where a user input requesting execution of the wireless charging is received from the user, the processor 518 may perform the wireless charging with the charging circuit 540 of the second electronic device 530 through the charging circuit 520 of the first electronic device 510. Alternatively, the wireless charging may be initiated after being requested through a physical button provided in the first electronic device 510.

The charging circuit 520 of the first electronic device 510 may include the second communication circuit 521, a charging coil 522, a matching circuit 523, a rectification circuit 524, an adjustment circuit 525, a switch circuit 526, and a battery 527, each of which may perform an operation that is previously set to perform the wireless charging. The charging circuit 540 of the second electronic device 530 may perform an operation corresponding to that of the charging circuit 520 of the first electronic device 510.

An operation in which the first electronic device 510 processes an event occurring in the second electronic device 530 will be described below. It is assumed that the first electronic device 510 corresponds to the first electronic device 410 illustrated in FIG. 4 and the second electronic device 540 corresponds the second electronic device 420 illustrated in FIG. 4. It is also assumed that a rear surface of the first electronic device 510 and a rear surface of the second electronic device 530 face each other and the first electronic device 540 is positioned on the second electronic device 530.

For the first electronic device 510 to provide the UI after processing an event occurring in the second electronic device 530, vertical arrangement of the first electronic device 510 and the second electronic device 530 may be first determined. For example, the processor 518 of the first electronic device 510 may determine a direction, which a front surface of the first electronic device 510 faces, through the sensor circuit 512 to provide the UI. The processor 518 may determine an arrangement relationship between the first electronic device 510 and the second electronic device 530 through the operation. For example, the processor 518 may determine whether the front surface of the first electronic device 510 faces a sky direction or a ground direction, by using a gyro sensor. Alternatively, the processor 518 may determine a direction that the front surface of the first electronic device 510 faces, based on whether an image (e.g., user's face image or user's body image) associated with a user, a bright image of specified illuminance or more, or a dark image of specified illuminance or less is captured by using an image sensor provided on the front surface of the first electronic device 510.

The processor 518 may provide an UI, which is configured to determine an electronic device that will transmit power and an electronic device that will receive power, through the display circuit 514. Alternatively, the processor 518 may receive information about the remaining capacity of the battery 547 of the second electronic device 530 through communication with the second electronic device 530 and may determine an electronic device that will transmit power and an electronic device that will receive power, by comparing the remaining capacity of the received information with the remaining capacity of the battery 527 of the first electronic device 510.

According to an embodiment, in the case where the wireless charging is made, the processor 518 may provide a UI that is configured to determine whether to receive a signal, which provides notification that an event occurs in the second electronic device 530, from the second electronic device 530. The processor 538 of the second electronic device 530 may be in a state in which it is previously determined that a signal that provides notification that an event occurs in the second electronic device 530 will be sent to the first electronic device 510.

The signal may be sent and received through the first communication circuit 516 of the first electronic device 510 and the first communication circuit 536 of the second electronic device 530. The signal may make use of a frequency band for wireless charging between the first electronic device 510 and the second electronic device 530. In this case, the signal may be sent and received through the second communication circuit 521 of the first electronic device 510 and the second communication circuit 541 of the second electronic device 530.

In the case where an event corresponding to the signal is an event providing notification that an incoming call is received to the second electronic device 530, the processor 518 may inform the user that the incoming call is being received, through the display 514. In this case, caller information of the incoming call may be provided. Also, the processor 518 may provide a UI in which a selection may be made to respond to or decline the incoming call. In the case when a selection is made to respond to the incoming call, the processor 518 may allow responding to the incoming call through a speaker of the first electronic device 510. Alternatively, the processor 518 may request the second electronic device 530 to respond to the incoming call through a speaker of the second electronic device 530, through the first communication circuit 516.

In the case where an event corresponding to the signal is a reception event on a text message, the processor 518 may inform the second electronic device 530 that the text message is received. In this case, sender information of the text message may be provided. Also, the processor 518 may provide a UI in which a selection may be made to check the text message. In the case when a selection is made to check the text message, the processor 518 may provide the user, through the display circuit 514, with the whole text message or part of the text message, for example, contents of first two lines of the text message. Alternatively, the processor 518 may request the second electronic device 530 to provide the text message through the speaker of the second electronic device 530 by voice (e.g., a request may be made through the first communication circuit 516 or the second communication circuit 512). Also, after providing the text message, the processor 518 may provide a UI in which a selection may be made to respond to the text message.

The processor 518 may provide an event corresponding to the signal so as to be overlaid on a screen provided in a display of the first electronic device 510. Screen information associated with the provided event may be provided in the form of pop-up that is displayed in a predetermined time. The processor 518 may separately set a display area that will provide an event corresponding to the signal. In this case, the display area may correspond to a mirrored version of a screen to be provided in the display of the second electronic device 530. This operation will be described with reference to FIGS. 7 to 11.

The processor 518 may differently determine whether to transfer an event, based on a composition (or arrangement) in which the first electronic device 510 and the second electronic device 530 are arranged.

The processor 518 may delete the provided event from a memory of the first electronic device if the wireless charging between the first electronic device 510 and the second electronic device 530 ends. In the case where the event is provided in a pop-up form, the processor 518 may delete contents of a corresponding event from the memory of the first electronic device 510 when the popped-up event appears.

The processor 518 may change an event notification method of the first electronic device 510 and the second electronic device 530 into a silent (or non-audible) or sound notification method while the wireless charging is made.

In the case where an event notification method set in the first electronic device 510 or the second electronic device 530 corresponds to a vibration mode, the alignment between the first electronic device 510 and the second electronic device 530 may vary by vibration when an event occurs in the first electronic device 510 or the second electronic device 530. Accordingly, when performing wireless charging, each of the first electronic device 510 and the second electronic device 530 may change the event notification method into a silent or sound notification method or a method of providing notification by vibration.

Also, in the first electronic device 510 and the second electronic device 530, one electronic device positioned under the other electronic device may turn off a display of the other electronic device. Accordingly, it may be possible to reduce battery consumption of an electronic device.

Also, the wireless charging may be made when the first electronic device 510 and the second electronic device 530 are mutually authenticated. In the case where the authentication is made, the processor 518 may make decision as receiving the signal, without displaying a UI that is configured to determine whether to receive the signal providing notification of the event. In addition, the processor 518 may skip an authentication procedure for an electronic device that was authenticated through the authentication procedure, based on a previous authentication history.

The first electronic device 510 may include a user input circuit. The user input circuit may process a user input that is input from the user. The user input may be a touch input using a user's finger or a stylus (e.g., an electronic pen). Also, the user input may include an input for providing an input through an electric change, although the user's finger or the stylus does not directly contact the screen, for example, a hover input. The user input circuit may be a touch integrated circuit (IC).

The user input circuit may distinguishably process touch inputs of various kinds. The user input may include the following: touch down, touch drag (or touch move), touch release, touch hold (or long press), and drag and drop.

Figure 6:
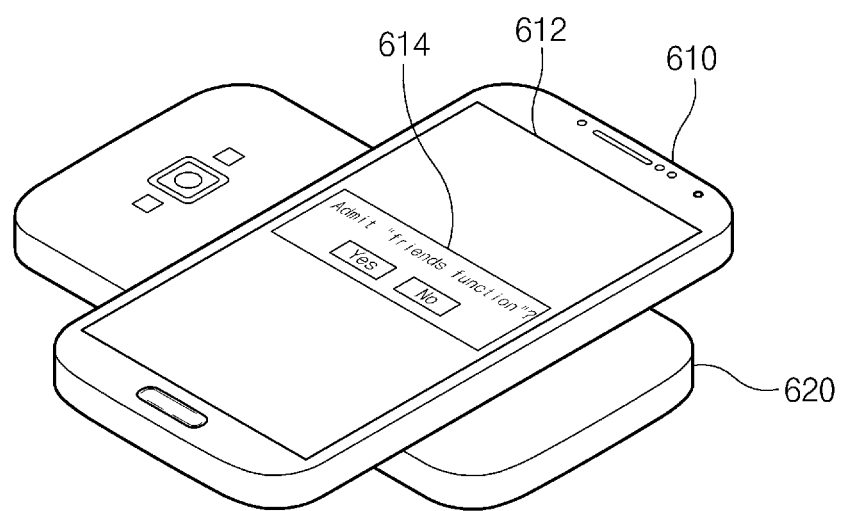
FIG. 6 illustrates a first electronic device and a second electronic device performing wireless charging, according to an embodiment of the present disclosure.

FIG. 6 illustrates a first electronic device and a second electronic device performing wireless charging, according to an embodiment of the present disclosure.

Referring to FIG. 6, a first electronic device 610 may be positioned such that a rear surface of the first electronic device 610 faces a rear surface of a second electronic device 620. In this position, wireless charging is made between the first electronic device 610 and the second electronic device 620.

During the wireless charging, the first electronic device 610 may provide, through a display 612, an UI 614 that is configured to determine whether to receive an event signal occurring in the second electronic device 620. An operation in which the first electronic device 610 provides the UI 614 may be performed based on a result of determining whether a front surface of the first electronic device 610 faces an upper side thereof.

Figure 7:
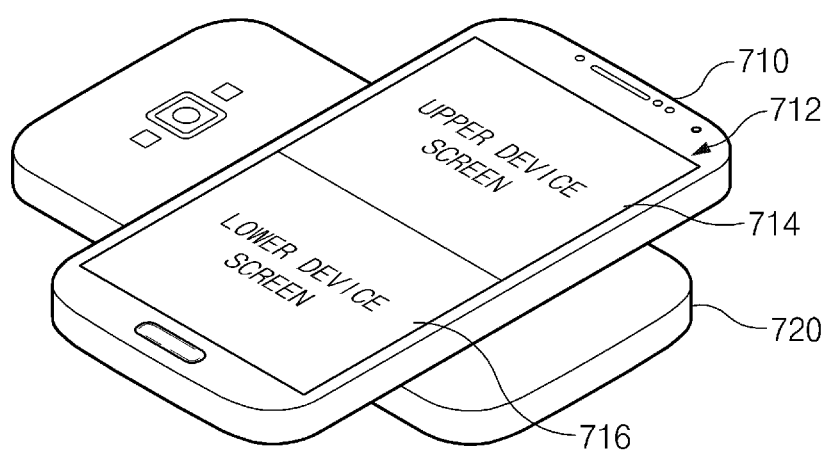
FIG. 7 illustrates a first electronic device and a second electronic device performing wireless charging, according to an embodiment of the present disclosure.

FIG. 7 illustrates a first electronic device and a second electronic device performing wireless charging, according to an embodiment of the present disclosure.

Referring to FIG. 7, a first electronic device 710 may be positioned such that a rear surface of the first electronic device 610 faces a rear surface of a second electronic device 720. In this position, wireless charging is made between the first electronic device 710 and the second electronic device 720.

The first electronic device 710 may provide an event occurring in the second electronic device 720 through a display 712. The first electronic device 710 may distinguish a display area 714 that will provide an operation performed in the first electronic device 710 and a display area 716 that will provide the event, in the display 712. In this case, the first electronic device 710 may provide only the event through the display area 716, or the first electronic device 710 may output an operation, which is performed in the second electronic device 720, in a display area by using a mirroring manner.

Figure 8:
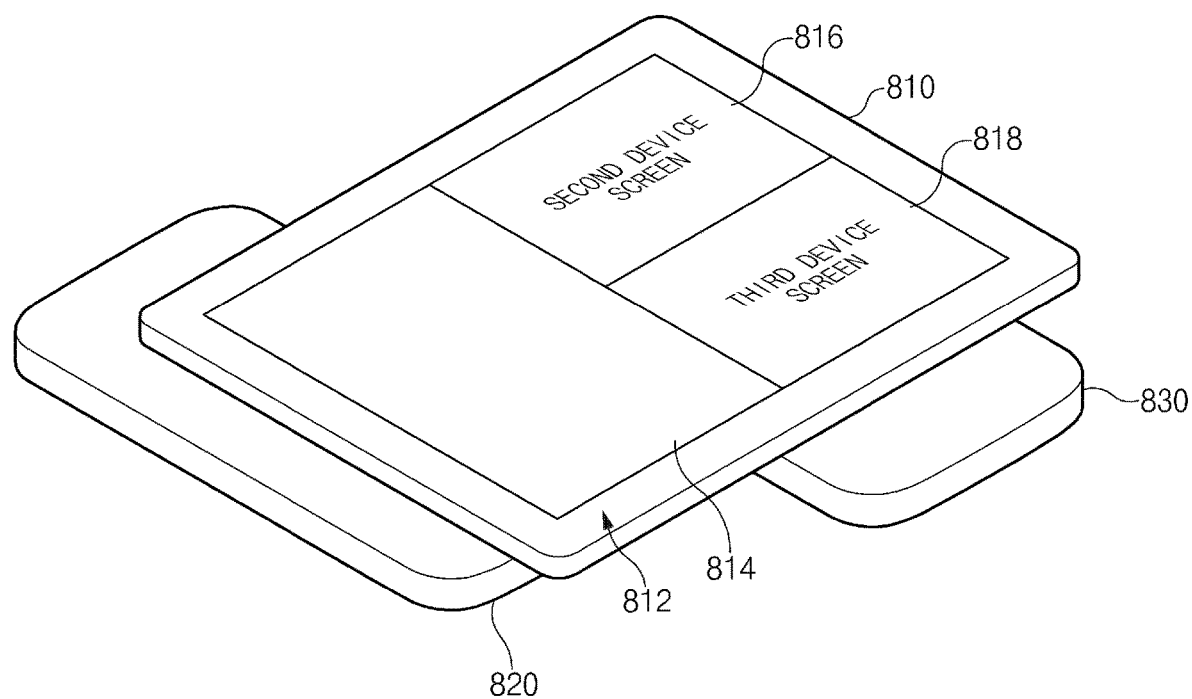
FIG. 8 illustrates a first electronic device, a second electronic device, and a third electronic device performing wireless charging, according to an embodiment of the present disclosure.

FIG. 8 illustrates a first electronic device, a second electronic device, and a third electronic device performing wireless charging, according to an embodiment of the present disclosure.

Referring to FIG. 8, a first electronic device 810 may be positioned such that a rear surface of the first electronic device 810 faces a rear surface of a second electronic device 820 and a rear surface of a third electronic device 830. In this position, wireless charging is made between the first electronic device 810 and the second and third electronic devices 820 and 830.

Unlike that described in the above embodiments, the first electronic device 810 may include two charging coils. In this case, the first electronic device 810 may receive or transmit power through the two charging coils. In addition, the first electronic device 810 may receive power through one charging coil of the two charging coils and may transmit power through the other charging coil. The first electronic device 810 may include at least a part of the charging circuit 520 of FIG. 5 in plurality.

The first electronic device 810 may provide events occurring in the second electronic device 820 and the third electronic device 830 through a display 812. The first electronic device 810 may distinguish a display area 814 that will provide an operation performed in the first electronic device 810, a display area 816 that will provide an event occurring in the second electronic device 820, and a display area 818 that will provide an event occurring in the third electronic device 830. In this case, the first electronic device 810, may provide only the event through each of the display areas 816 and 818 and may provide both an operation performed in the second electronic device 820 and an operation performed in the third electronic device 830 in a mirroring manner. A location or size of each of the display areas 814, 816, and 818 of the display 812 may be changed according to information to be displayed or the intention of user.

Figure 9:
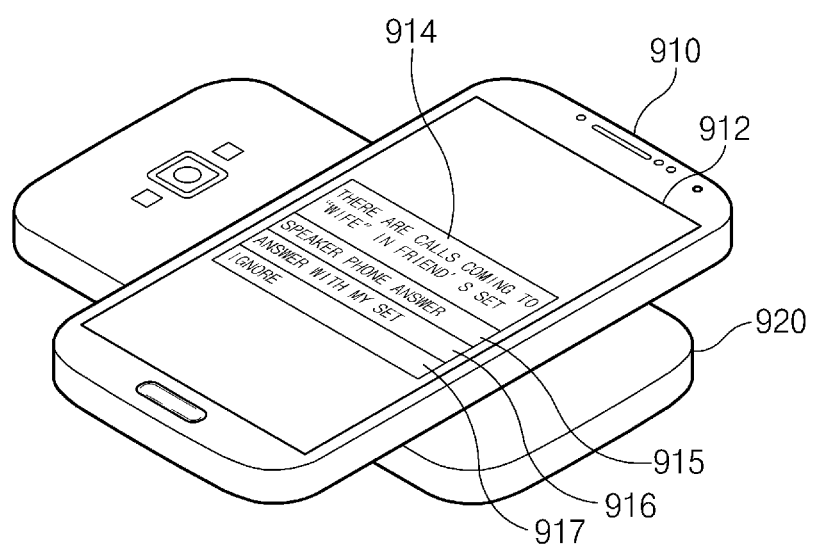
FIG. 9 illustrates a state in which a second electronic device performing wireless charging with a first electronic device, receives an incoming call, according to an embodiment of the present disclosure.

FIG. 9 illustrates a state in which a second electronic device performing wireless charging with a first electronic device, receives an incoming call, according to an embodiment of the present disclosure.

Referring to FIG. 9, a first electronic device 910 may be positioned such that a rear surface of the first electronic device 910 faces a rear surface of a second electronic device 920. In this position, wireless charging is made between the first electronic device 910 and the second electronic device 920. The first electronic device 910 permits receiving an event, which occurs in the second electronic device 920, from the second electronic device 920.

The second electronic device 920 may receive an incoming call from a base station device while performing the wireless charging. The second electronic device 920 may send a signal, which provides notification that the incoming call is being received, to the first electronic device 910. The first electronic device 910 may provide an incoming call reception event occurring in the second electronic device 920 through the display 912, based on the signal. In this case, the first electronic device 910 may provide the event and simultaneously provide a UI 914 for determining a way to respond to the event. The UI 914 may include a choice 915 for responding to the incoming call through a speaker of the second electronic device 920, a choice 916 for responding to the incoming call through a speaker of the first electronic device 910, or a choice 917 for not responding to the incoming call.

The UI 914 may provide an event corresponding to the signal so as to be overlaid on a screen provided in a display of the first electronic device 910. The provided event may be provided in the form of pop-up that is displayed in a predetermined time.

Figure 10:
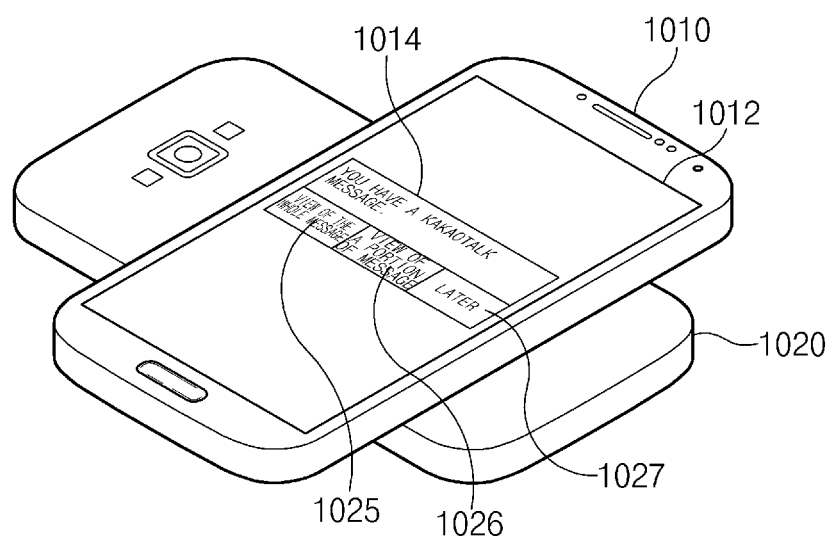
FIG. 10 illustrates a state in which a second electronic device performing wireless charging with a first electronic device, receives a text message, according to an embodiment of the present disclosure.

FIG. 10 illustrates a state in which a second electronic device performing wireless charging with a first electronic device, receives a text message, according to an embodiment of the present disclosure.

Referring to FIG. 10, a first electronic device 1010 may be positioned such that a rear surface of the first electronic device 610 faces a rear surface of a second electronic device 1020. In this position, wireless charging is made between the first electronic device 1010 and the second electronic device 1020. The first electronic device 1010 permits receiving an event, which occurs in the second electronic device 1020, from the second electronic device 1020.

The second electronic device 1020 may receive a text message from a base station device while performing the wireless charging. The second electronic device 1020 may send a signal, which provides notification that the text message is received, to the first electronic device 1010. The first electronic device 1010 may provide a text message reception event occurring in the second electronic device 1020 through the display 1012, based on the signal. In this case, the first electronic device 1010 may provide the event and simultaneously provides a UI 1014 for determining a way to respond to the event. The UI 1014 may include a choice 1025 for viewing the whole text message, a choice 1026 for viewing a portion of the text message, or a choice 1027 for viewing the text message later.

In the case where the choice 1026 for viewing a portion of the text message is selected, the choice 1026 may include caller information, a title, a level of urgency, and the like of the text message.

The UI 1014 may provide an event corresponding to the signal so as to be overlaid on a screen provided in a display of the first electronic device 1010. The provided event may be provided in the form of pop-up that is displayed in a predetermined time.

Figure 11:
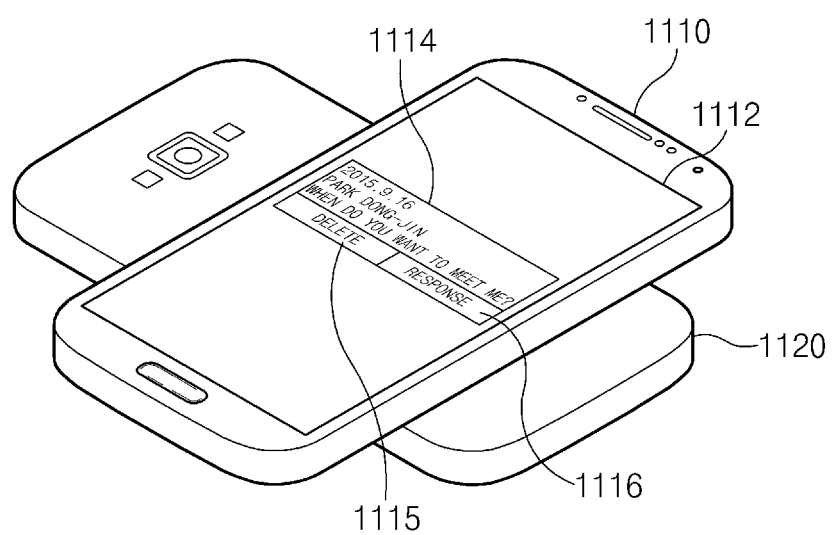
FIG. 11 illustrates a state in which a second electronic device performing wireless charging with a first electronic device, receives a text message and provides the text message through the first electronic device, according to an embodiment of the present disclosure.

FIG. 11 illustrates a state in which a second electronic device performing wireless charging with a first electronic device, receives a text message and provides the text message through the first electronic device, according to an embodiment of the present disclosure.

Referring to FIG. 11, a first electronic device 1110 may be positioned such that a rear surface of the first electronic device 1110 faces a rear surface of a second electronic device 1120. In this position, wireless charging is made between the first electronic device 1110 and the second electronic device 1120. The first electronic device 1110 permits receiving an event, which occurs in the second electronic device 1120, from the second electronic device 1120.

As described above, the first electronic device 1110 may provide a text message received from the second electronic device 1120 through a display 1112, based on a user input.

In this case, a UI 1114 that provides a text message may include a choice 1115 for deleting the confirmed text message and a choice 1116 for responding to the confirmed text message. In the case where the choice 1115 is selected, the first electronic device 1110 may delete the text message from a memory and may allow deletion of the text message to be confirmed by a user. Also, in the case where the choice 1116 is selected, the first electronic device 1110 may determine whether to respond to the confirmed text message through a UI of the first electronic device 1110 or through a UI of the second electronic device 1120.

The UI 1114 may provide an event corresponding to the signal so as to overlay a screen provided in a display of the first electronic device 1110. The provided event may be provided in the form of pop-up that is displayed in a predetermined time.

Figure 12:
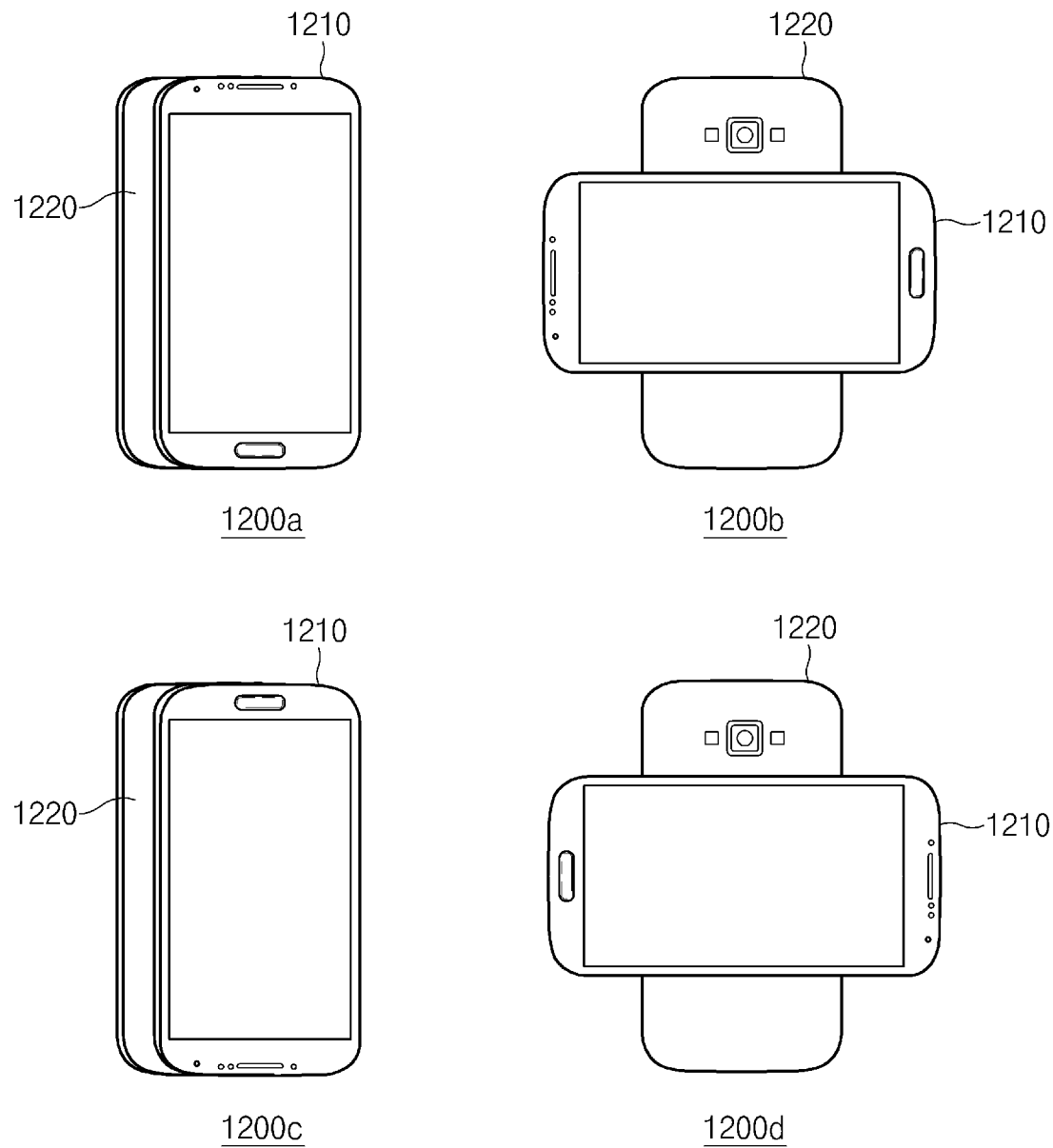
FIG. 12 illustrates various settings according to arrangement patterns while wireless charging is made between a first electronic device and a second electronic device, according to an embodiment of the present disclosure.

FIG. 12 illustrates various settings according to arrangement patterns while wireless charging is made between a first electronic device and a second electronic device, according to an embodiment of the present disclosure.

Referring to FIG. 12, a first electronic device 1210 may be positioned such that a rear surface of the first electronic device 1210 faces a rear surface of a second electronic device 1220. In this position, the wireless charging is made between the first electronic device 1210 and the second electronic device 1220.

In pattern 1200a, long axes (longitudinal axes) of the first electronic device 1210 and the second electronic device 1220 may be arranged in the same direction. For example, in a state where the second electronic device 1220 is arranged, a receiver of the second electronic device 1220 may be placed on an upper side of the second electronic device 1220 in FIG. 12, and a home button of the second electronic device 1220 may be placed on a lower side of the second electronic device 1220 in FIG. 12.

A description will be given under the assumption that arrangement of the first electronic device 1210 is only changed while the second electronic device 1220 is in the same state, in pattern 1200a to pattern 1200d. In this case, the first electronic device 1210 may be rotated by 90 degrees about the second electronic device 1220.

The first electronic device 1210 may have one or more ways to provide an event. For example, the first electronic device 1210 may have a first way to provide all events occurring in the second electronic device 1220, a second way to provide only events (e.g., an incoming call reception event and a text message reception event), which are previously determined, occurring in the second electronic device 1220, a third way to not provide an event occurring in the second electronic device 1220, and a fourth way to provide only the fact that an event occurs with regard to all events occurring in the second electronic device 1220, without providing event contents.

An electronic device may include a communication circuit configured to wirelessly transmit and receive power to and from an external electronic device, a sensor circuit configured to collect a sensor signal associated with a state of the electronic device and a processor electrically connected with the communication circuit and the sensor circuit, wherein the processor is configured to determine an arrangement relationship with the external electronic device through the sensor circuit, on the basis of the determined arrangement relationship, receive a signal, which provides notification that an event occurs in the external electronic device, through the communication circuit or transmit a signal, which provides notification that an event occurs in the electronic device, to the external electronic device.

The processor may receive the signal from the external electronic device through the communication circuit if a display of the electronic device is exposed to the outside.

A communication method to transmit and receive the power to and from the external electronic device and a communication method to receive the signal from the external electronic device are different from each other.

A communication method to receive the signal from the external electronic device corresponds to local area communication.

The electronic device may further include a display electrically connected with the processor, wherein the processor provides a first UI in which whether to perform an operation of receiving the signal from the external electronic device is selected, through the display.

The processor may be configured to output an event, which occurs in the electronic device while transmitting and receiving the power, through the external electronic device without using a vibration mode.

The processor may be configured to provide a second UI for querying whether to provide the event through the display in response to the received signal.

The second UI may include at least one of a second UI in which whether to provide the event in the electronic device or whether to provide the event in the external electronic device is selected, a second UI in which whether to provide the whole event or part of the event is selected, if the event is provided in the electronic device, or a second UI in which whether to allocate an area of the display of the electronic device to provide the event is selected, if the event is provided in the electronic device.

If the event is provided in the electronic device, the processor may delete information about the provided event when an operation of transmitting and receiving the power to and from the external electronic device ends.

In the case where a device, which has a relatively high battery level, of the electronic device and the external electronic device is changed while the electronic device is charging from the external electronic device or the external electronic device is charging from the electronic device, the processor may be configured to provide notification of the case.

The processor may perform an operation of authenticating the external electronic device.

The processor may receive a signal for requesting a change in a way to provide the event occurring in the electronic device, from the external electronic device through the communication circuit.

According to an embodiment of the present disclosure, an electronic device may include a housing, a conductive pattern arranged in the interior of the housing, a power management circuit arranged in the interior of the housing and is electrically connected with the conductive pattern, a wireless communication circuit arranged in the interior of the housing, a display exposed through one surface of the housing, a processor electrically connected with the conductive pattern, the power management circuit, the wireless communication circuit, and the display, and a memory electrically connected with the processor, wherein the memory stores instructions, the instructions, when executed, causing the processor to wirelessly receive power from an external device or wirelessly transmit power to the external device, by using at least one of the conductive pattern or the power management circuit, receive at least one event occurring in the external device while the power is transmitted or received and/or information about a state of operation of external electronic device from the external device through the wireless communication circuit, and display at least a portion of the received information in at least a part of the display.

The instructions cause the processor to determine whether to provide a state in which the at least one event occurring in the external device while the power is transmitted or received and/or the information about the state is capable of being received from the external device through the wireless communication circuit, and receive the information from the external device based on the determination that allows the state to be provided.

The instructions cause the processor to display, on the display, a user interface configured to determine whether to provide the state, based on a user input to the user interface.

The at least one event and/or the information about the state comprises information about at least one of reception of a message in the external device, reception of an incoming call in the external device, and a notification set in the external device.

According to an embodiment of the present disclosure, an electronic device may include a housing, a conductive pattern arranged in the interior of the housing, a power management circuit arranged in the interior of the housing and electrically connected with the conductive pattern, a wireless communication circuit arranged in the interior of the housing, a display exposed through one surface of the housing, a processor electrically connected with the conductive pattern, the power management circuit, the wireless communication circuit, and the display, and a memory electrically connected with the processor, wherein the memory stores instructions, the instructions, when executed, causing the processor to wirelessly receive power from an external device or wirelessly transmit power to the external device, by using at least one of the conductive pattern or the power management circuit, and transmit at least one event occurring in the electronic device while the power is transmitted or received and/or information about a state from the external device through the wireless communication circuit to allow at least a portion of the information to be provided to a user through the external electronic device.

Figure 13:
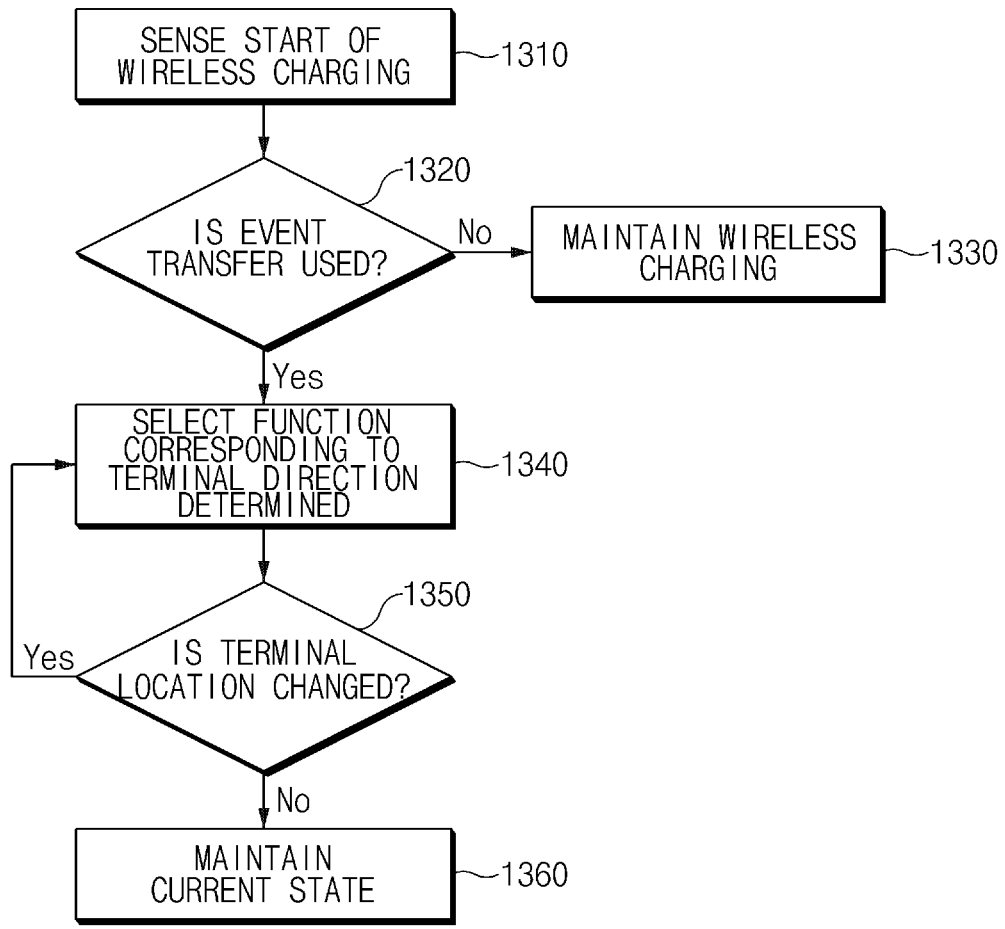
FIG. 13 is a flowchart of a method of performing a wireless charging operation between a first electronic device and a second electronic device, according to an embodiment of the present disclosure.

FIG. 13 is a flowchart of a method of performing a wireless charging operation between a first electronic device and a second electronic device, according to an embodiment of the present disclosure.

Referring to FIG. 13, in step 1310, a first electronic device 1210 may sense a start of wireless charging.

In step 1320, the first electronic device 1210 may determine whether to use a transfer of an event occurring in a second electronic device 1220 through an UI that will be provided through a display of the first electronic device 1210. Whether to transfer an event occurring in the second electronic device 1220 to the first electronic device 1210 may be previously determined.

If the determination of step 1320 indicates that an event is not transferred, in step 1330, the first electronic device 1210 may perform simply wireless charging.

If the determination of step 1320 indicates that an event is transferred, in step 1340, the first electronic device 1210 may determine a way to provide the event in the first electronic device 1210, based on the arrangement between the first electronic device 1210 and the second electronic device 1220.

For example, the first electronic device 1210 may have a first way to provide all events occurring in the second electronic device 1220, a second way to provide only events (e.g., an incoming call reception event and a text message reception event), which are previously determined, occurring in the second electronic device 1220, a third way to not provide an event occurring in the second electronic device 1220, and a fourth way to provide only the fact that an event occurs with regard to all events occurring in the second electronic device 1220, without providing event contents. However, the present disclosure is not limited thereto. For example, a way to provide an event may be variously implemented.

In step 1350, the first electronic device 1210 may determine whether the arrangement between the first electronic device 1210 and the second electronic device 1220 varies.

If it is determined in step 1350 that the arrangement varies, the process may proceed to step 1340.

If it is determined in step 1350 that the arrangement does not vary, the process proceeds to step 1360, and the first electronic device may maintain a current state.

Figure 14:
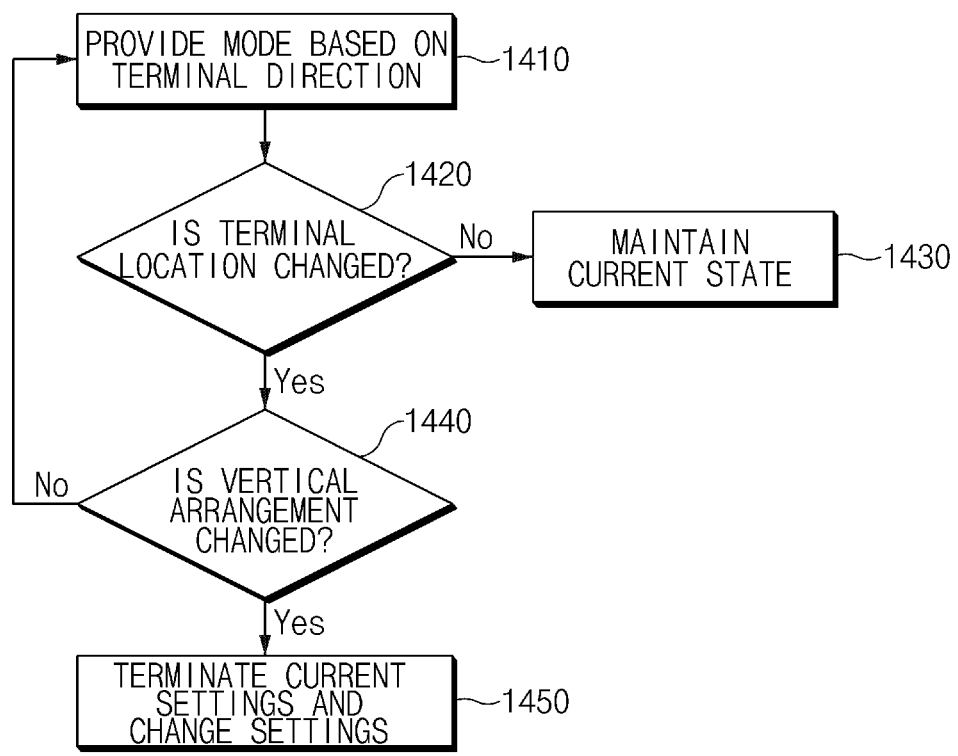
FIG. 14 is a flowchart of a method of performing a wireless charging operation between a first electronic device and a second electronic device, according to an embodiment of the present disclosure.

FIG. 14 is a flowchart of a method of performing a wireless charging operation between a first electronic device and a second electronic device, according to an embodiment of the present disclosure.

Referring to FIG. 14, in step 1410, the first electronic device 1210 may provide a previously determined mode based on arrangement directions of the first electronic device 1210 and the second electronic device 1220.

In step 1420, the first electronic device 1210 may determine whether the arrangement directions of the first electronic device 1210 and the second electronic device 1220 are changed.

If it is determined in step 1420 that the arrangement directions are not changed, then the process proceeds to step 1430, and the first electronic device 1210 may maintain a current state.

If it is determined in step 1420 that the arrangement directions are changed, then the process proceeds to step 1440, and the first electronic device 1210 may determine whether the vertical arrangement between the first electronic device 1210 and the second electronic device 1220 is changed.

If it is determined in step 1440 that the vertical arrangement is not changed, then the process may return to step 1410. For example, a way to provide an event may be changed as terminal arrangement is changed.

Otherwise, if it is determined in step 1440 that the vertical arrangement is changed, then the process may proceed to step 1450, and the first electronic device 1210 may terminate current settings based on the change in the vertical arrangement and may change settings. For example, the first electronic device 1210 may perform an operation of transferring an event to the second electronic device 1220 instead of an operation of being provided with an event from the second electronic device 1220.

Figure 15:
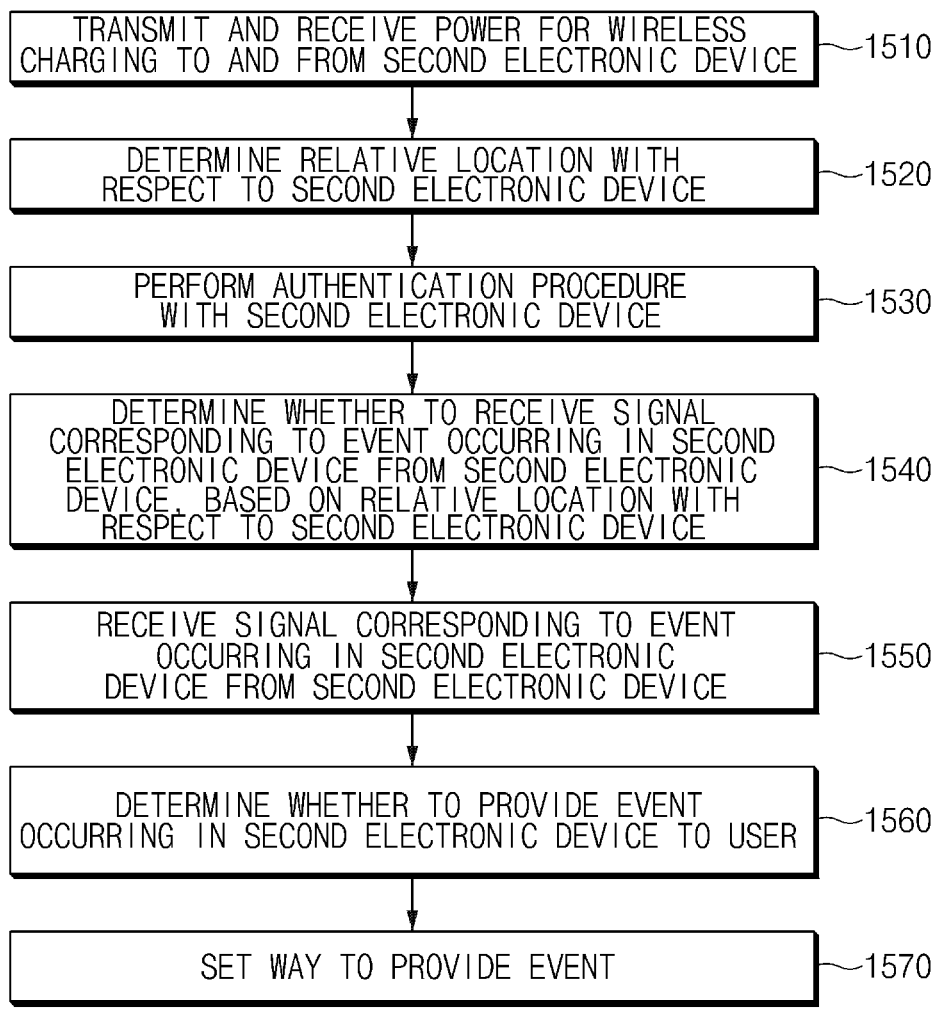
FIG. 15 is a flowchart of an operation performed while wireless charging is made in a first electronic device, according to an embodiment of the present disclosure.

FIG. 15 is a flowchart of an operation performed while wireless charging is made in a first electronic device, according to an embodiment of the present disclosure.

Referring to FIG. 15, in step 1510, a first electronic device 1210 may transmit and receive power for wireless charging to and from a second electronic device 1220. The wireless charging may be made through an UI, which is provided through a display of the first electronic device 1210, or through a physical button thereof.

In step 1520, the first electronic device 1210 may determine a relative location with respect to the second electronic device 1220. For example, the first electronic device 1210 may determine whether a charging coil of the first electronic device 1210 and a charging coil of the second electronic device 1220 are aligned with each other. In addition, the first electronic device 1210 may determine whether the first electronic device 1210 is positioned on the second electronic device 1220 or whether the second electronic device 1220 is positioned on the first electronic device 1210. Below, a description will be given under the assumption that the first electronic device 1210 is positioned on the second electronic device 1220.

In step 1530, the first electronic device may perform an authentication procedure with the second electronic device. The authentication procedure may include a procedure to input a password of the second electronic device.

In step 1540, the first electronic device 1210 may determine whether to receive a signal, which corresponds to an event occurring in the second electronic device 1220, from the second electronic device 1220 based on the relative location determined in step 1520. The determination may be made based on a user input that is received by using a UI provided through a display of the first electronic device 1210.

In step 1550, the first electronic device 1210 may receive the signal, which corresponds to an event occurring in the second electronic device 1220, from the second electronic device 1220.

In step 1560, the first electronic device may determine whether to provide the event corresponding to the signal to the user, based on the signal received in step 1550. The determination of whether to provide the event to the user may be made based on a user input that is received by using a UI provided through the display of the first electronic device 1210.

If it is determined in step 1570 that an event is provided to the user, in step 1560, the first electronic device 1210 may set a way to provide the event. For example, the first electronic device 1210 may display a UI in a screen to set a way to provide an event. For example, the first electronic device 1210 may provide an event corresponding to an incoming call generated in the second electronic device 1220 and may not provide an event corresponding to a received message. Alternatively, the first electronic device 1210 may set an event to be viewed based on a direction in which the first electronic device 1210 is positioned (e.g., a landscape mode or a portrait mode) or an arrangement relationship with the second electronic device 1220.

In the case where the first electronic device 1210 provides a function of viewing only at least a portion of an event (e.g., in a message, a title and a sender thereof are viewed), the first electronic device 1210 may separately process and provide only at least a portion of an event received from the second electronic device 1220 to be suitable for the provided function.

Figure 16:
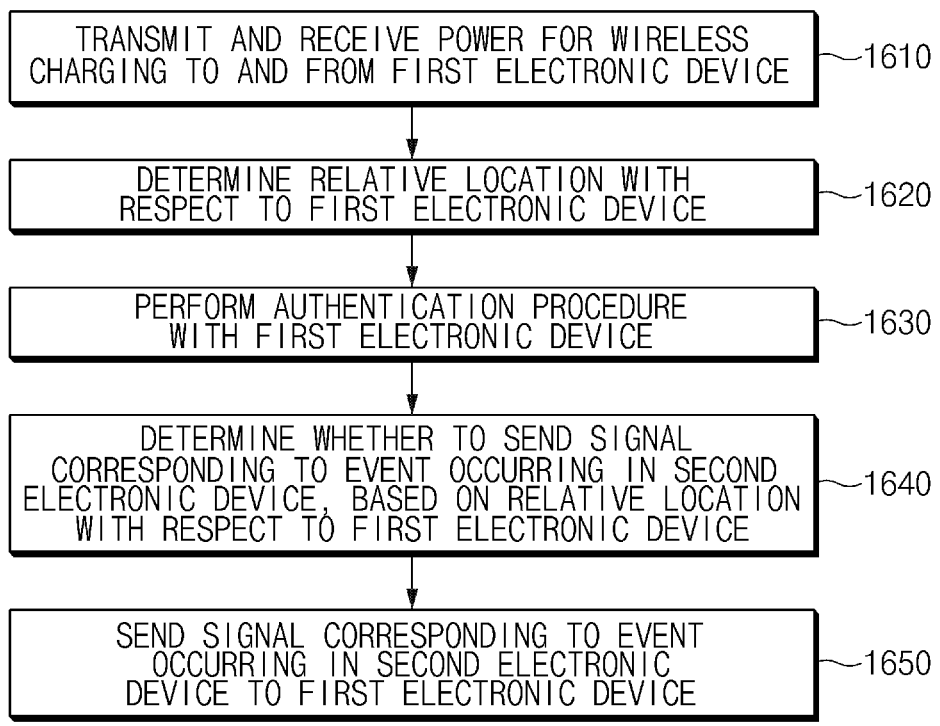
FIG. 16 is a flowchart of an operation performed while wireless charging is made in a second electronic device, according to an embodiment of the present disclosure.

FIG. 16 is a flowchart of an operation performed while wireless charging is made in a second electronic device, according to an embodiment of the present disclosure.

Referring to FIG. 16, in step 1610, a second electronic device 1220 may transmit and receive power for wireless charging to and from a first electronic device 1210. The wireless charging may be made through a UI, which is provided through a display of the second electronic device 1220, or through a physical button thereof.

In step 1620, the second electronic device 1220 may determine a relative location with respect to the first electronic device 1210. For example, the second electronic device 1220 may determine whether a charging coil of the first electronic device 1210 and a charging coil of the second electronic device 1220 are aligned with each other. In addition, the second electronic device 1220 may determine whether the second electronic device 1220 is positioned on the second electronic device 1220 or whether the first electronic device 1210 is positioned on the second electronic device 1220. Below, a description will be given under the assumption that the first electronic device 1210 is positioned on the second electronic device 1220.

In step 1630, the second electronic device 1220 may perform an authentication procedure with the first electronic device 1210.

In step 1640, the second electronic device 1220 may determine whether to transmit a signal, which corresponds to an event occurring in the second electronic device 1220, from the first electronic device 1210 based on the relative location determined in step 1620. The determination may be made based on a user input that is received by using a UI provided through a display of the first electronic device 1210.

In step 1650, the second electronic device 1220 may transmit the signal, which corresponds to an event occurring in the second electronic device 1220, to the first electronic device 1210.

The terminology "module" used herein may mean a unit including one of hardware, software, and firmware or two or more combinations thereof. The term "module" may be interchangeably used with the terms "unit", "logic", "logical block", "component", "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

At least part of the electronic device (e.g., modules or the functions) or a method (e.g., operations) of the electronic device may be implemented with instructions stored in computer-readable storage media which have a program module. When the instructions are executed by a processor, one or more processors may perform functions corresponding to the instructions. The computer-readable storage media may be a memory.

The computer-readable storage media may include a hard disc, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), a flash memory, and the like), and the like. Also, the program instructions may include not only mechanical codes compiled by a compiler but also high-level language codes which may be executed by a computer using an interpreter. The above-mentioned hardware device may be configured to operate as one or more software modules to perform operations according to various embodiments of the present disclosure, and vice versa.

The modules or program modules may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

The above-described embodiments of the present disclosure can be implemented in hardware, firmware or via the execution of software or computer code that can be stored in a recording medium such as a CD ROM, DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., advanced reduced instruction set computing machine (ARM)-based processors), a digital signal processor (DSP), a programmable logic device (PLD), an application-specific integrated circuit (ASIC), a field-programmable gate array (FPGA), a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the drawings may be implemented in hardware, software or a combination of both and may be performed in whole or in part within the programmed instructions of a computer. In addition, as used herein, a processor or microprocessor may be implemented as hardware.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure. Accordingly, the scope of the present disclosure is defined not by the detailed description and embodiments, but by the following claims and their equivalents.

What is claimed is:

1. An electronic device comprising:
a display,
a communication circuit that wirelessly transmits and receives power to and from an external electronic device;
a sensor circuit that collects a sensor signal associated with a state of the electronic device; and
a processor operatively connected to the display, the communication circuit and the sensor circuit, and configured to:
determine a direction of the display based on the sensor signal;
when the direction of the display is a first direction, receive, from the external electronic device, a first notification signal associated with an event which occurs in the external electronic device while wirelessly charging based on the external electronic device; and
display a first user interface (UI), through the display, including the first notification signal while wirelessly charging based on the external electronic device.

2. The electronic device of claim 1, wherein the processor is further configured to:
when the direction of the display is a second direction opposite to the first direction, transmit, to the external electronic device, a second notification signal indicating that an event occurs in the electronic device while wirelessly charging based on the external electronic device.

3. The electronic device of claim 1, wherein the processor is further configured to:
receive the first notification signal from the external electronic device, through the communication circuit, if a display of the electronic device is exposed to the outside.

4. The electronic device of claim 1, wherein the processor is further configured to:
transmit and receive using a first communication method and the first notification signal is received using a second communication method.

5. The electronic device of claim 4, wherein the first communication method corresponds to local area communication.

6. The electronic device of claim 1, wherein the processor is further configured to:
output an event, which occurs in the electronic device while transmitting and receiving the power, through the external electronic device without using a vibration mode.

7. The electronic device of claim 1, wherein the processor is further configured to:
provide a second UI for querying whether to provide the event through the display in response to the received first notification signal.

8. The electronic device of claim 7, wherein the second UI comprises at least one of:
a second UI for selecting whether to provide the event in the electronic device or to provide the event in the external electronic device;
a second UI for selecting whether to provide an entire event or a part of the event, when the event is provided in the electronic device; and
a second UI in which whether to allocate an area of the display of the electronic device to provide the event is selected, if the event is provided in the electronic device.

9. The electronic device of claim 8, wherein the processor is further configured to:
if the event is provided in the electronic device, delete information about the provided event when an operation of transmitting and receiving the power to and from the external electronic device ends.

10. The electronic device of claim 1, wherein the processor is further configured to provide a notification when a device, which has a relatively high battery level, of the electronic device and the external electronic device is changed while the electronic device is charging from the external electronic device or the external electronic device is charging to from the electronic device.

11. The electronic device of claim 1, wherein the processor is further configured to:
receive, from the external electronic device through the communication circuit, a signal for requesting a change in a way to provide the event occurring in the electronic device.

* * * * *